(12) United States Patent
Hillmyer et al.

(10) Patent No.: US 10,077,340 B2
(45) Date of Patent: Sep. 18, 2018

(54) POLY(BETA-METHYL-DELTA-VALEROLACTONE) BLOCK POLYMERS

(71) Applicant: REGENTS OF THE UNIVERSITY OF MINNESOTA, Minneapolis, MN (US)

(72) Inventors: Marc A. Hillmyer, Minneapolis, MN (US); Deborah Kay Schneiderman, Minneapolis, MN (US); Frank Steven Bates, St. Louis Park, MN (US); Kechun Zhang, Roseville, MN (US)

(73) Assignee: REGENTS OF THE UNIVERSITY OF MINNESOTA, Minneapolis, MN (US)

(*) Notice: Subject to any disclaimer, the term of this patent is extended or adjusted under 35 U.S.C. 154(b) by 0 days.

(21) Appl. No.: 15/304,568

(22) PCT Filed: Apr. 17, 2015

(86) PCT No.: PCT/US2015/026325
§ 371 (c)(1),
(2) Date: Oct. 17, 2016

(87) PCT Pub. No.: WO2015/161169
PCT Pub. Date: Oct. 22, 2015

(65) Prior Publication Data
US 2017/0044326 A1    Feb. 16, 2017

Related U.S. Application Data

(60) Provisional application No. 61/980,684, filed on Apr. 17, 2014, provisional application No. 61/980,686, filed on Apr. 17, 2014, provisional application No. 62/135,759, filed on Mar. 20, 2015.

(51) Int. Cl.
| | | |
|---|---|---|
| *C08G 18/10* | (2006.01) | |
| *C08G 81/00* | (2006.01) | |
| *C08G 63/00* | (2006.01) | |
| *C08G 63/08* | (2006.01) | |
| *C08G 18/42* | (2006.01) | |
| *C08G 18/76* | (2006.01) | |

(52) U.S. Cl.
CPC ............. *C08G 81/00* (2013.01); *C08G 18/10* (2013.01); *C08G 18/428* (2013.01); *C08G 18/4266* (2013.01); *C08G 18/4275* (2013.01); *C08G 18/7671* (2013.01); *C08G 63/00* (2013.01); *C08G 63/08* (2013.01)

(58) Field of Classification Search
CPC .................................................... C08G 81/00
USPC ..................................... 528/80, 84; 525/411
See application file for complete search history.

(56) References Cited

U.S. PATENT DOCUMENTS

| | | | | |
|---|---|---|---|---|
| 4,551,518 A | * | 11/1985 | Matsumoto | ........ C08G 18/4275 528/65 |
| 2015/0130389 A1 | | 5/2015 | Hino et al. | |
| 2016/0068877 A1 | | 3/2016 | Zhang et al. | |
| 2016/0145227 A1 | | 5/2016 | Dugar et al. | |
| 2017/0044326 A1 | | 2/2017 | Hillmyer et al. | |

FOREIGN PATENT DOCUMENTS

| | | | | |
|---|---|---|---|---|
| EP | 0686656 | * | 12/1995 | ............. C08G 63/08 |
| EP | 0686656 A2 | | 12/1995 | |
| EP | 1120432 A1 | | 1/2001 | |
| EP | 1120432 | * | 8/2001 | ............. C08G 63/60 |
| EP | 1411083 | * | 4/2004 | ......... C08G 18/0895 |
| EP | 1411083 A1 | | 4/2004 | |
| WO | WO 2015/161169 A1 | | 10/2015 | |

OTHER PUBLICATIONS

Abstract, EP-0686656, Hagiwara Toshimitsu C O Takasa; Dec. 1995.*
Abstract, EP-1120432, Watanabe Jun, Aug. 2001.*
Abstract, EP-1411083, Saito Hidekazu, Apr. 2004.*
Achkar, "Biosyntehsis of phloroglucinol," 2005, *J Am Chem Soc*, 127:5332-5333.
Ajikumar, "Isoprenoid pathway optimization for Taxol precursor overproduction in *Escherichia coli*," 2010, Science, 330:70-74.
Anderson, "Toughening polylactide," 2008 *Polym Rev*, 48:85-108.
Atsumi, "Non-fermentative pathways for synthesis of branched-chain higher alcohols as biofuels," 2008 *Nature*, 451:86-89.
Bastian, "Engineered ketol-acid reductoisomerase and alcohol dehydrogenase enable anaerobic 2-methylpropan-1-ol production at theoretical yield in *Escherichia coli*," 2011 *Metab Eng*, 13:345-352.
Bates, "Multiblock polymers:panacea or Pandora's box?" 2012 *Science*, 336:434- 440.
Bougioukou, "Directed Evolution of an Enantioselective Enoate-Reductase:Testing the Utility of Iterative Saturation Mutagenesis," 2009, *Adv Synth Catal*, 351:32873305.
Causey, "Engineering the metabolism of *Escherichia coli*W3110 for the conversion of sugar to redox-neutral and oxidized products:homoacetate production," 2003, *Proc Natl Acad Sci USA*, 100:825-832.
Datsenko, "One-step inactivation of chromosomal genes in *Escherichia coli*K-12 using PCR products" 2000, *Proc Natl Acad Sci USA*, 97:6640-6645.
Dellomonaco, "Engineered reversal of the beta-oxidation cycle for the synthesis of fuels and chemicals," 2011, *Nature*, 476:355-359.

(Continued)

*Primary Examiner* — Terressa Boykin
(74) *Attorney, Agent, or Firm* — Mueting, Raasch & Gebhardt, PA

(57) ABSTRACT

Block copolymers include a poly β-methyl-δ-valerolactone (PMVL) block. The PMVL blocks can be formed from biosynthesized β-methyl-δ-valerolactone (MVL). The PMVL block may be formed from biosynthesized β-methyl-δ-valerolactone (MVL) with a $^{14}C/^{12}C$ ratio greater than zero. The block copolymers can include hard blocks. The block copolymers can be thermoplastic elastomers. The block copolymers may include a polylactic acid (PLA) block.

15 Claims, 15 Drawing Sheets

(56) References Cited

OTHER PUBLICATIONS

Enquist-Newman, "Efficient ethanol production from brown macroalgae sugars by a synthetic yeast platform," 2014 *Nature*, 505:239-243.
Grundlinger, "Fungal siderophore biosynthesis is partially localized in peroxisomes," 2013 *Mol Microbiol*, 88:862-875.
Hall, "Asymmetric Bioreduction of Activated C=C Bonds Using *Zymomonas mobilis*NCR Enoate Reductase and Old Yellow Enzymes OYE 1-3 from Yeasts," 2008 *European J Org Chem*, 2008:1511-1516.
Handlin, "Applications of Thermoplastic Elastomers Based on Styrenic Block Copolymers," 2007 Macromolecular Engineering, (Wiley-VCH Verlag GmbH& Co. KGaA), 2001-2031.
International Search Report and Written Opinion, Application No. PCT/US2015/026325 dated Jul. 7, 2015.
Kiesewetter, "Cyclic Guanidine Organic Catalyst:What is Magic About Triazabicyclodecene?" 2009 *J Org Chem*, 74:9490-9496.
Lin, "Homo- and Block Copolymerizations of $_E$-Decalactone with L-Lactide Catalyzed by Lanthanum Compounds," 2013 *Macromolecules*, 46:7769-7776.
Ma, "Complete reconstitution of a highly reducing iterative polyketide synthase," 2009 *Science*, 326:589-592,.
Martello, "Bulk Ring-Opening Transesterification Polymerization of the Renewable $_o$-Decalactone Using an Organocatalyst," 2012 *ACS Macro Lett*, 1, 131-135.
Martello, "Polylactide-Poly(6-methyl-E-caprolactone)-Polylactide Thermoplastic Elastomers," 2011 *Macromolecules*, 44:8537-8545.
Martin, "Engineering a mevalonate pathway in *Escherichia coli*for production of terpenoids," 2003 *Nat Biotechnol*, 21:796-802.
Miller, "Sustainable Polymers:Opportunities for the Next Decade," 2013 *ACS Macro Lett*, 2:550-554.
Morton, "Structure-Property Relations in Amorphous and Crystallizable ABA Triblock Copolymers,"1983 *Rubb Chem Technol*, 56, 1096-1110.
Nakayama, Study of Biodegradability of Poly (δ-valerolactone-co-$_L$-lactide)s, 1997 *Journal of Applied Polymer Science*, 66:741-748.
Nakayama, "Synthesis and degradability of a novel aliphatic polyester:poly (β-methylo-valerolactone-co-$_L$-lactide)" 1995 *Polymer*, 36:1295-1301.
Olsen, "$_E$-Decalactone:A Thermoresilient and Toughening Comonomer to Poly(L-lactide)," 2013 *Biomacromolecules*, 14:2883-2890.
Orjuela, "A novel process for recovery of fermentation-derived succinic acid:Process design and economic analysis" 2013 *Bioresour Technol*, 139:235-241.
Paddon, "High-level semi-synthetic production of the potent antimalarial artemisinin," 2013 *Nature*, 496:528-532.
Park, "Metabolic engineering of *Escherichia coli*for the production of 5-aninovalerate and glutarate as C5 platform chemicals," 2013 *Metab Eng*, 16:42-47.
Pfeifer, "Biosynthesis of complex polyketides in a metabolically engineered strain of *E. coli*," 2001 *Science*, 291:1790-1792.
Posada, "Design and economic analysis of the technological scheme for 1,3-propanediol production from raw glycerol," 2013 *Ther Found Chem Eng*, 47:239-253.
Ro, "Production of the antimalarial drug precursor artemisinic acid in engineered yeast," 2006 *Nature*, 440, s:940-943.
Sanna, "The Current Status and Future Expectations in Industrial Production of Lactic Acid by Lactic Acid Bacteria," 2013 DOI:10.5772/51282.
Save, "Controlled Ring-Opening Polymerization of Lactones and Lactides Initiated by Lanthanum Isopropoxide, 1. General Aspects and Kinetics,:Macromol," 2002 *Chem Phys*, 203, 889-899.
Sawai, "Crystal density and heat of fusion for a stereo-complex of poly(L-lactic acid) and poly(D-lactic acid)" 2007 *Journal of Polymer Science Part B:Polymer Physics*, 45:2632-2639.
Schmalz, "Thermoplastic elastomers based on semicrystalline block copolymers," 2003 *Compo Sci Technol*, 63:1179-1186.
Shirahama, "Development of a new biodegradable polymer," 1993 *Kobunshi Ronbunshu*, 50, n. 11:821-835. (in Japanese).
Soetaert, "The impact of industrial biotechnology" 2006 *Biotechnol J*, 1:756-769.
Steen, "Microbial production of fatty-acid-derived fuels and chemicals from plant biomass," 2010 *Nature*, 463:559-562.
Tabata, "Production of mevalonate by a metabolically-engineered *Escherichia coli*," 2004 *Biotechnol Lett*, 26:1487-1491.
Tseng, "Controlled biosynthesis of odd-chain fuels and chemicals via engineered modular metabolic pathways," 2012 *Proc Natl Acad Sci USA*, 109:17925-17930.
Tsui, "Biodegradable Polyesters from Renewable Resources," 2013 *Annu Rev Chem Biomol Eng*, 4:143-170.
Wanamaker, "Renewable-resource thermoplastic elastomers based on polylactide and polymenthide," 2007 *Biomacromolecules*, 8:3635-3640.
Wu, "Improved 1,3-propanediol production by engineering the 2,3-butanediol and formic acid pathways in integrative recombinant *Klebsiella pneumonia*" 2013 *J Biotechnol*, 168:194-200.
Xiong, "A bio-catalytic approach to aliphatic ketones," 2012, *Scientific*, 2:311.
Xiong, "Scalable production of mechanically tunable block polymers from sugar," 2014 *PNAS*, 111,(23):8357-8362.
Yang, "Enhancing production of bio-isoprene using hybrid MVA pathway and isoprene synthase in *E. coli*," 2012 *PLoS One*, 7: 27.
Yasmin, "Mevalonate governs interdependency of ergosterol and siderophore biosyntheses in the fungal pathogen *Aspergillus fumigatus*," 2012, *Proc Natl Acad Sci USA*, 109: 21.
Yim, "Metabolic engineering of *Escherichia coli*for direct production of 1,4- butanediol," 2011, *Nat Chem Biol*, 7:445-452.
Yusem, "Computer-aided electrochemical process design:simulation and economic analysis of an electrocatalytic soybean oil hydrogenation plant," 1997, *J Appl Electrochem*, 27(10):1157-1171.
Zhu, "Effects of culture operating conditions on succinate production in a multiphase fed-batch bioreactor using an engineered *Escherichia coli*strain," 2011, *Appl Microbiol Biotechnol*, 92:499-508.

\* cited by examiner

US 10,077,340 B2

POLY(BETA-METHYL-DELTA-VALEROLACTONE) BLOCK POLYMERS

RELATED APPLICATION

This application is the § 371 U.S. National Stage of International Application No. PCT/US2015/026325, filed 17 Apr. 2015, which claims the benefit of U.S. Provisional Application Nos. 61/980,684 and 61/980,686, both of which were filed on Apr. 17, 2014, and U.S. Provisional Application No. 62/135,759, filed on Mar. 20, 2015, which are hereby incorporated herein by reference in their respective entireties.

STATEMENT OF GOVERNMENTAL SUPPORT

This invention was made with government support under CHE-1136607 awarded by the National Science Foundation. The government has certain rights in the invention.

FIELD

This disclosure relates to, among other things, block copolymers having at least one poly(β-methyl-δ-valerolactone) block.

BACKGROUND

Development of sustainable and biodegradable materials, such as bio-based polymers, may be important for future growth of the chemical industry. However, few bio-based polymers are considered to be commercially competitive.

SUMMARY

Among other things, this disclosure describes the use of controlled polymerization techniques to produce well defined polymers having poly(β-methyl-δ-valerolactone) (PMVL) blocks. The PMVL blocks can be formed from biosynthesized β-methyl-δ-valerolactone (MVL).

In some embodiments described herein, the elastomeric polymer PMVL is combined with hard polymers to produce block copolymers having soft (PMVL) and hard blocks. For example, hard block-PMVL-hard block triblock polymers are described herein. In various embodiments, hard blocks are semicrystalline poly(L-lactide) or glassy poly(lactide) (PLLA or PLA, respectively) blocks or polyurethane blocks.

A variety of methods for producing PMVL block copolymers are described herein. Such methods include polymerizing monomers from a living PMVL polymer or a telechelic PMVL block and coupling a PMVL block to another polymer block.

One or more embodiments of the compounds, polymers, compositions or methods described herein may provide one or more advantages relative to existing compounds, polymers, compositions or methods. By way of example, block copolymers, in various embodiments described herein, having one or more blocks formed from biosynthesized monomers have mechanical properties akin to commercially available thermoplastics and elastomers. In some embodiments, the reaction parameters to produce such block copolymers can be readily changed to tune the mechanical properties of the resulting block copolymer. Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

DETAILED DESCRIPTION

Figure 1:
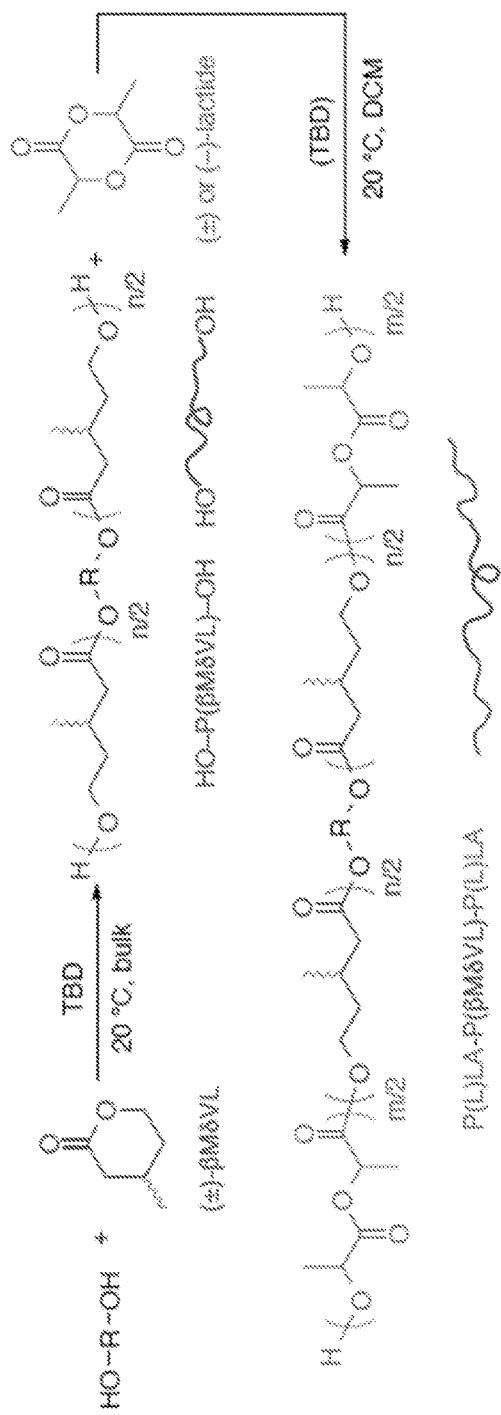
FIG. 1. Polymerization of βMδVL leading to PMVL and chain extension with (±)- or (−)-lactide (LA or LLA) yielding P(L)LA-PMVL-P(L)LA triblock polymer. TBD represents triazabicyclodecene and HO—R—OH represents 1,4-phenylenedimethanol.

This disclosure relates to, among other things, polymers that include a poly(β-methyl-δ-valerolactone) (PMVL) block and methods of manufacturing such polymers. Preferably, but not in all embodiments, a PMVL block can be formed from biosynthesized MVL. As used herein, a "biosynthesized compound" is a compound in which at least one step of its synthesis is performed by an organism, such as a microbe. Some routes and processes for producing biosynthesized MVL are described in U.S. Provisional Patent Application No. 61/813,354, filed on Apr. 18, 2013; U.S. Provisional Patent Application No. 61/866,233, filed on Aug. 15, 2013; and PCT patent application WO 2014/172596, published on Oct. 23, 2014, which applications are hereby incorporated herein by reference to the extent that they do not conflict with the present disclosure.

A biosynthesized compound can be distinguished from a similar compound produced by conventional chemical processes from, for example, a petroleum-based material by the ratio of $^{14}C$ to $^{12}C$ in a sample of the compound. A sample of the compound that is biosynthesized will possess a measurable amount of $^{14}C$ isotopes incorporated into the compound molecules. A sample of the compound prepared from petroleum-based materials will possess negligible levels of $^{14}C$. Thus, a sample or composition that includes a biosynthesized compound (e.g., MVL) will typically possess a $^{14}C/^{12}C$ ratio greater than zero. In some cases, a sample or composition that includes a biosynthesized compound can have a $^{14}C/^{12}C$ ratio greater than $0.25\times10^{-12}$ such as, for example, a $^{14}C/^{12}C$ ratio from $0.25\times10^{-12}$ to $1.2\times10^{-12}$.

In some embodiments, the PMVL block of a block copolymer described herein has a $^{14}C/^{12}C$ ratio greater than zero. In some cases, the PMVL block can have a $^{14}C/^{12}C$ ratio greater than or equal to $0.25\times10^{-12}$ such as, for example, a $^{14}C/^{12}C$ ratio from $0.25\times10^{-12}$ to $1.2\times10^{12}$.

In some embodiments, a block copolymer described herein has a $^{14}C/^{12}C$ ratio greater than zero. In some cases, the block copolymer can have a $^{14}C/^{12}C$ ratio greater than $0.25\times10^{-12}$ such as, for example, a $^{14}C/^{12}C$ ratio from $0.25\times10^{-12}$ to $1.2\times10^{-12}$.

Block copolymers allow for the properties of different polymer materials to be extended by combining two or more different polymers in a final product. The properties of a block copolymer can be tailored by tuning the length and the type of blocks used.

In various embodiments, a block copolymer including a PMVL block can be a di-block copolymer (A-B), a tri-block copolymer (e.g., A-B-C, A-B-A or B-A-B), or a multiblock copolymer [e.g., (A-B)$_n$].

In some embodiments of a polymer comprising a PMVL block and a second block, the second block has a glass transition temperature greater than the PMVL block. For examples, the second block can have a glass transition temperature greater that the glass transition temperature of the PMVL block by about 10° C. or more, by about 20° C., by about 30° C. or more, about 40° C. or more, about 50° C. or more, about 60° C. or more, or about 70° C. or more. In some embodiments, a second block will have a glass transition temperature no more than about 300° C. greater than a PMVL block.

The PMVL block can have any suitable glass transition temperature. In some embodiments, the PMVL block has a Tg of less than −30° C. For example, the PMVL block can have a Tg of less than −40° C. or less than −50° C. In many embodiments, the PMVL block has a Tg greater than −100° C. In some embodiments, the PMVL block has a Tg of about −51° C.

In various embodiments, the block copolymers described herein can include a PMVL soft block and a hard block. A hard block has a glass transition temperature of about room temperature or greater. In some embodiments, the hard block has a glass transition temperature of about 25° C. or greater, such as in a range from about 30° C. to about 90° C., in a range from about 40° C. to about 80° C., or in a range from about 50° C. to about 70° C. By way of example, polylactic acid, which can be a hard block can have a glass transition temperature in a range from about 60° C. to about 65° C.

Any suitable hard block may be joined with a PMVL block. In some embodiments, hard blocks are crystalline or semicrystalline blocks at room temperature (e.g., at about 23° C.). Examples of hard blocks include polylactic acid blocks, polycaprolactone blocks, polygylcolide blocks, polytrimethylene carbonate blocks, polyhydroxybutyrate blocks, polybutylene succinate blocks, polyurethane blocks, or copolymers of these blocks, and the like. In some embodiments, the hard block can be a biobased block such as a biosynthesized polylactic acid block, a biosynthesized polyhydroxybutyrate block, or a biosynthesized polybutylene succinate block.

In block copolymers having a hard block and a PMVL block, the PMVL (soft) segments can influence the elastic nature of the block copolymer and can contribute to low temperature properties and extensibility of the block copolymer.

In various embodiments, the block copolymers described herein are thermoplastic elastomers that combine a PMVL elastomer with a hard block thermoplastic polymer. Such thermoplastic elastomers behave like elastomers at temperatures between the glass transition temperatures of PMVL and the polymer of the hard block and can be processed like thermoplastics at temperatures above the glass transition temperature of the polymer of the hard block. Examples of thermoplastic polymers that can be used include those hard block polymers listed above, such as polylactic acid, polycaprolactone, polygylcolide, polytrimethylene carbonate, polyhydroxybutyrate, polybutylene succinate, polyurethane, polystyrene, polyolefin such as polyethylene or polypropylene, or copolymers of these polymers, and the like. In some embodiments, the thermoplastic polymers used as hard blocks can be a biobased block such as biosynthesized polylactic acid, biosynthesized polyhydroxybutyrate, or biosynthesized polybutylene succinate.

PMVL blocks may be formed in any suitable manner. For example, PMVL may be formed via ring-opening transesterification polymerization (ROTEP) of MVL employing an appropriate initiator and catalyst. Any suitable catalyst may be employed. Examples of suitable catalysts include metal catalysts or organocatalysts, such as tin octoate; triethyl aluminum; zinc dibutoxide; titanium tetrabutoxide; triazobicyclodecene (TBD); 1,4-Benzene dimethanol (BDM); diphenyl phosphate (DPP); and the like.

Any suitable initiator may be employed. For example, the initiator may be an organometal (e.g. alkyl lithium, alkyl magnesium bromide, alkyl aluminum, etc.), a metal amide, an alkoxide, a phosphine, an amine, an alcohol, or the like. In some embodiments, the initiator is an alcohol. The initiator may be monofunctional or multi-functional. Examples of suitable ring opening polymerization initiators include benzyl alcohol; 1,4 benzene dimethanol; and the like. One of skill in the art will understand that the ratio of monomer to initiator may be varied to obtain polymers of different molecular weights.

Polymerization of MVL may occur in solution, in the melt, or as a suspension.

The PMVL blocks can be of any suitable length. In some embodiments, a PMVL block has a mass average molar mass ($M_w$) of 0.25 kDa or greater, such as 0.5 kDa or greater, or 1 kDa or greater. In some embodiments, a PMVL block has $M_w$ of from about 1 to about 500 kDa, such as from about 2 to about 250 kDa or from about 3 to about 100 kDa.

Non-PMVL blocks, such as hard blocks, can be formed in any suitable manner, such as polymerization of one or more monomers, or the like. For purposes of example, polylactic acid may be formed via ring opening polymerization of lactide or by condensation of lactic acid. Preferably, the polylactic acid blocks are formed via ring opening polymerization of lactide. Any suitable catalyst may be employed for ring opening polymerization of lactide. Examples of suitable catalysts and initiators include those catalysts and initiators described above with regard to polymerization of MVL. Polymerization of lactide may occur in solution, in the melt or as a suspension.

By way of further example, polyhydroxybutyrate may be formed via polymerization of hydroxybutyryl-CoA. Alternatively, polyhydroxybutyrate may be isolated from a microorganism, such as *Ralstonia eutrophus* or *Bacillus megaterium*, and modified for conjugation to a PMVL block. Ring-opening polymerization of beta butyrolactones or copolymerization of epoxides and carbon monoxide represent chemical routes to polyhrdroxybutyrates.

By way of yet another example, polybutylene succinate may be formed via esterification of succinic acid with 1,4 butanediol to form polybutylene succinate oligomers which can then be transesterified to form larger molecular weight polymers. Any suitable catalyst may be used for either step. For example, a titanium, zirconium, tin or germanium-based catalyst may be used for the transesterification reaction.

By way of yet further example, polyurethane may be formed via reaction of a di- or polyisocyanate with a polyol to achieve a polyurethane. In some embodiments, the polyurethane is a hard block containing phase-separated and semi-crystalline domains. Any suitable compound having two or more isocyanate groups and any suitable polyol can be used to form a polyurethane. Examples of suitable compounds having two or more isocyanate groups include methylene diphenyl diisocyanate, isophorone diisocyanate, L-lysine diisocyanate, and the like. Examples of suitable polyols include 1,3 propane diol, 1,4 butane diol, and the like.

It will be understood that the above, are merely examples of suitable hard blocks and methods for forming hard blocks. One of skill in the art would understand that other hard blocks may be used and may be readily synthesized.

Non-PMVL blocks, such as hard blocks, can be of any suitable length. In some embodiments, a non-PMVL block (e.g., an individual end block) has a mass average molar mass ($M_w$) of from about 0.5 to about 100 kDa, such as from about 1 to about 50 kDa or from about 2 to about 30 kDa. In general, a block will have a Mw of about 0.25 kDa or greater.

Block copolymers described herein can be formed in any suitable manner. In some embodiments, non-PMVL blocks (or PMVL blocks) are added to PMVL blocks (or non-PMVL blocks) via living polymerization. For example, monomers forming a non-PMVL block (or a PMVL block) can be added to a living PMVL (or non-PMVL), preferably at equilibrium. Preferably, the catalyst employed for the polymerization of the living polymer is suitable for use in polymerizing the later added monomers for forming the other block or blocks. Of course, one or more additional catalysts may be added as appropriate.

In some embodiments, an ABA triblock copolymer is formed via living polymerization. Monomers for forming the B block can be polymerized and monomers forming the A blocks can be added to the living B block polymer. By way of example, $_{D,L}$-Lactide, $_D$-Lactide or $_L$-Lactide can be added to a living PMVL. In some embodiments, triazobicyclodecene (TBD) can be used to catalyze the MVL polymerization and polymerization of the lactide (e.g., via ring opening polymerization).

In some embodiments, non-MVL monomers (or MVL monomers) are added to a previously-purified telechelic PMVL (or telechelic poly(non-MVL)). For example, the purified telechelic PMVL (or telechelic poly(non-MVL)) and non-MVL monomer (or MVL) can be combined in solution or in melt/bulk and a catalyst can be added to cause polymerization of the non-MVL monomer (or MVL) from one or more ends of the previously-purified telechelic PMVL (or telechelic poly(non-MVL)). The amount of added non-MVL monomer (or MVL) added can depend on the target composition of the block polymer.

In some embodiments, an ABA block copolymer is formed by adding non-MVL monomers and a catalyst to a telechelic PMVL in solution or in melt/bulk to cause polymerization of the non-MVL monomer from the ends of the previously-purified telechelic PMVL.

In some embodiments, non-PMVL oligomers, such as hard block oligomers, are reacted with telechelic PMVL to form a copolymer. Alternatively PMVL-(non-PMVL) coblocks can be synthesized to form multiblocks. Coupling agents, such as those generally known in the art, can be used to couple the oligomers to form a block copolymer or to couple the coblocks to form the multiblocks. By way of example, multiblocks can be synthesized conveniently from dihydroxy telechelic PLA-PMVL-PLA triblock using a coupling approch. Coupling agents that can be used for this purpose include diacid chlorides, such as for example terephthalic acid and sebacoyl chloride, diisocyantes, such as for example methylene diisocyante, and divinyl adipate.

A block copolymer described herein may include any suitable amount of PMVL and non-PMVL block polymer. For example, the weight percent of hard block polymer in a hard block-PMVL block copolymer (e.g., a hard block-PMVL-hard block ABA block copolymer) can be from about 5% to about 95%, such as from 10% to about 90%, from about 20% to about 70%, or from about 25% to about 60%.

The lengths and percentages of non-PMVL block polymer and PMVL may be modified to achieve desired properties of a block copolymer (e.g., a PLA-PMVL-PLA ABA block copolymer). Hard blocks tend to be hard, while PMVL tends to be soft. By varying the percent and length of hard blocks and PMVL the properties of the resulting copolymer can be tuned as desired. For example, incorporation of relatively small amounts of the hard block polymer, soft highly elastic polymeric material may result. By way of further example, incorporation of higher amounts of the hard block polymer, stiffer and ductile plastics may result.

In some embodiments, a block copolymer described herein has an elastic modulus of from about 0.1 MPa to about 2500 MPa, such as from about 0.2 MPa to about 1500 MPA, from about 0.5 MPa to about 500 MPa, from about 1 MPA to about 400 MPa, or from about 1.5 MPa to about 300 MPa. In embodiments, block copolymer described herein has a percent elongation of from about 5% to about 5000%, such as from about 10% to about 4500%, from about 100% to about 4000%, from about 200% to about 3000%, or from about 300% to about 2000%.

Definitions

All scientific and technical terms used herein have meanings commonly used in the art unless otherwise specified.

The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. As used herein, "consisting essentially of," as it relates to a composition, product, method or the like, means that the components of the composition, product, method or the like are limited to the enumerated components and any other components that do not materially affect the basic and novel characteristic(s) of the composition, product, method or the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

As used herein, the term "about" encompasses the range of experimental error that occurs in any measurement.

As used herein, "polylactide" and "polylactic acid" are used interchangeably. A polylactide can be formed from $_D$-lactide, $_L$-lactide or $_{D,L}$-lactide, or combinations thereof Incorporation by Reference Any patent or non-patent literature cited herein, including provisional patent applications, is hereby incorporated herein by reference in its entirety to the extent that it does not conflict with the disclosure presented herein.

One of skill in the art will understand that one or more materials, articles, compositions, processes, and the like disclosed in one or more patent and non-patent literature cited herein can be modified to obtain a process, monomer, polymer or the like described herein.

In the description above several specific embodiments of compounds, compositions, products and methods are disclosed. It is to be understood that other embodiments are contemplated and may be made without departing from the scope or spirit of the present disclosure. The description, therefore, is not to be taken in a limiting sense.

In the following non-limiting examples that provide illustrative embodiments of the compositions, food products, methods and sweetness enhancers described above. These examples are not intended to provide any limitation on the scope of the disclosure presented herein.

EXAMPLES

Example 1

PMVL and PLA-PMVL-PLA Block Copolymers

Materials and Methods

Biosynthesis of MVL: MVL was synthesized generally as described in Example 2 of WO2014/172596A2, entitled BIOSYNTHETIC PATHWAYS AND PRODUCTS, published on 23 Oct. 2014.

Polymer Syntheses: Glass and teflon components used for polymer synthesis were dried in an oven at 100° C. for a minimum of 6 hours immediately prior to use. All reagents used for polymer synthesis were stored and handled in a glovebox under a nitrogen atmosphere. Triazobicyclodecene (TBD) (98%, Sigma-Aldrich) was purchased and purified by sublimation. 1,4-Benzene dimethanol (BDM) (99%, Acros Organics) and diphenyl phosphate (DPP) (99%, Sigma-Aldrich) were purchased and dried under vacuum at room temperature for a minimum of 48 hours prior to use. Benzyl alcohol (99%, Sigma-Aldrich) was purchased and used without additional purification. $_{D,L}$-Lactide was a kind gift from Ortec Incorporated and was used as received. $_L$-Lactide was a kind gift from Natureworks and was recrystallized twice from dry toluene and dried prior to use. Toluene and dichloromethane (DCM) was passed through a home-built solvent purification system, which includes a column of activated alumina and a column of molecular sieves operated under a positive pressure of nitrogen gas. Anhydrous methanol (Sigma-Aldrich) and chlorform (Fisher) were purchased and used as received. Triethylamine (99.5%, Macron), and benzoic acid (99.5%, Fisher) used to quench DPP and TBD catalyzed reactions, respectively were also purchased and used as received.

PMVL: To synthesize PMVL a monofunctional (benzyl alcohol) or difunctional (1,4 benzene dimethanol) alcohol was added to monomer in a pressure vessel or glass vial and stirred with a magnetic stir bar until completely dissolved. The ratio of monomer to alcohol was varied to target polymers of different molecular weights. When the initiator was dissolved an appropriate amount of catalyst (~0.05-0.2 mol % TBD or ~0.5 mol % DPP) relative to monomer was added to initiate the polymerization. The reaction was stirred and the conversion monitored using $^1$H NMR of crude quenched aliquots dissolved in $CDCl_3$. To obtain PMVL homopolymer the reaction was quenched by the addition of 5 equivalents, relative to catalyst, of either 1M benzoic acid in chloroform (TBD catalyzed reactions) or triethylamine (DPP catalyzed reactions). The quenched polymer was diluted with chloroform, precipitated in cold methanol and dried for a minimum of 24 hours at room temperature in a vacuum oven.

poly((L)LA)-b-PMVL-b-poly((L)LA): Addition of lactide to living polymerization: To prepare poly((L)LA)-b-PMVL-b-poly((L)LA) a solution of $_{D,L}$-Lactide or $_L$-Lactide in DCM (1M) was added slowly to a living TBD catalyzed polymerization at equilibrium while stirring manually with a glass stir rod. The amount of lactide solution added depended on the target composition of the block polymer. To obtain purified polymers the samples were quenched with benzoic acid, diluted with chloroform, precipitated in methanol, and dried.

DPP is not capable of catalyzing the polymerization of lactide therefore addition $_{D,L}$-Lactide in DCM PMVL in the presence of this catalyst resulted in depolymerization of PMVL rather than the synthesis of a block polymer.

poly((L)LA)-b-PMVL-b-poly((L)LA):TBD catalyzed addition of lactide to purified telechelic PMVL in solution: To prepare poly((L)LA)-b-PMVL-b-poly((L)LA) from a previously isolated and purified PMVL using TBD the prepolymer was dissolved in a 1 M solution of $_{D,L}$-Lactide or $_L$-Lactide in DCM, when fully dissolved 0.1 mol % TBD (relative to lactide) was added. The solution was stirred for 10 minutes, then quenched via the addition 5 equivalents of benzoic acid relative to TBD. To obtain purified polymers the samples were diluted with chloroform, precipitated in methanol, and dried.

poly((L)LA)-b-PMVL-b-poly((L)LA): $Sn(oct)_2$ catalyzed addition of lactide to purified telechelic PMVL in melt/bulk: To prepare poly((L)LA)-b-PMVL-b-poly((L)LA) from a previously isolated and purified PMVL in the melt the prepolymer was added to an appropriate amount of $_{D,L}$-Lactide or $_L$-Lactide in a 5-necked kettle reactor fitted with an overhead stir assembly, thermometer, gas inlet, bubbler, and septum. The contents were heated while stirring under constant argon flow until the internal temperature reached 180° C. At this time the solution was stirred for an additional ½ hour to ensure the contents were homogeneous then 0.05 mol % $Sn(oct)_2$ (relative to lactide) was injected. After stirring ½ hour the reaction was cooled to ambient temperature. To obtain purified polymers the samples were diluted with chloroform, precipitated in methanol, and dried.

Poly($_L$-Lactide): Poly($_L$-lactide) was synthesized from lactide at room temperature using TBD as a catalyst and benzene dimethanol as an initiator. To a 1 M solution of lactide in DCM benzene dimethanol was added and stirred until fully dissolved. To initiate the polymerization 0.1 mol % TBD relative to lactide was added and the reaction stirred for 5 minutes. At this time the catalyst was quenched via the addition of 5 equivalents of benzoic acid. The polymers were subsequently isolated by precipitation in methanol and dried for 24 hours in a vacuum oven.

Polymerization thermodynamics: Thermodynamic experiments were conducted in triplicate using the following method: In a glovebox MVL DPP, and 1,4 benzene dimethanol were mixed in a glass vial at a monomer:catalyst:initiator ratio of 100:1:0.78. Each resulting reaction mixture was allowed to stir for ½ hour at room temperature then divided into 10 ampules. These ampules were removed from the glovebox, sealed under vacuum, and stirred in oil baths at temperatures ranging from 20° C. to 130° C. An additional triplicate of ampules was incubated in a refrigerator at 4.5° C. These ampules were maintained at their assigned temperatures for 72 hours, after this time one ampule the set of triplicates was removed from each temperature, quenched with triethylamine in chloroform, and an aliquot removed for $^1$H NMR analysis. To ensure the polymerizations were at equilibrium the remaining two sets of the triplicate were quenched and analyzed at 96 hours and 160 hours. Reactions for which the conversion remained constant over the three times tested were taken to be at equilibrium.

Polymerization kinetics: A kinetics experiment was conducted using the following method: In a glovebox TBD was added to a vial containing MVL and stirred to dissolve. At this time benzyl alcohol was injected and immediately mixed, starting the polymerization. The initial concentrations of monomer, catalyst, and initiator were $[\beta M\delta VL]_0$=9.16 M, $[TBD]_0$=0.019 M, $[BnOH]_0$=0.032 M. Aliquots were taken and quenched with 1M benzoic acid before the addition of initiator (t=0) and periodically thereafter until the reaction reached 4 half-lives.

Polymer Characterization: For purified polymers dispersities (Đ) and mass-average molar masses ($M_m$) were determined using a size exclusion chromatography (SEC) instrument with THF as the mobile phase at 25° C. and a flow rate of 1 mL/min. Size exclusion was performed with three successive Phenomenex Phenogel-5 columns. The SEC was equipped with a Wyatt Technology DAWN DSP multi-angle laser light scattering (MALLS) detector in addition to a Wyatt Optilab EX RI detector. The mass average molar mass and dispersity were determined using the known concentration of the sample in THF and the assumption of 100% mass recovery to calculate dndc from the RI signal.

The relative mass average molar mass ($M_{m\text{-}PS}$) of unpurified polymer samples was determined via size exclusion chromatography (SEC) on a liquid chromatograph (Agilent 1100 series) equipped with a HP 1047A RI detector. Polymer samples were prepared in chloroform and passed through three successive Varian PLgel Mixed-C columns with chloroform as the mobile phase at 35° C. with a flow rate of 1 mL/min. Molecular weight characteristics of the samples were referenced to polystyrene standards (Polymer Laboratories).

$^1$H NMR spectra were collected from $CDCl_3$ performed on a Varian Inova spectrometer operating at 500 MHz. Chemical shifts reported are referenced to the protic solvent (7.26 ppm for $CHCl_3$). $^{13}$C NMR spectra were collected on the same spectrometer operating at 126 MHz. Chemical shifts reported are referenced to middle solvent at 77.36 ppm.

Differential scanning calorimetry (DSC) was conducted using a TA Instruments Discovery DSC instrument with hermetically sealed T-zero aluminum pans. The samples were equilibrated at 150° C. and cooled to −75° C. at 5° C. min$^{-1}$ followed by heating to 150° C. at the same rate. Glass transition temperatures are reported upon the second heating cycle. Thermogravimetric analysis (TGA) was performed on a Perkin Elmer Diamond TGA/DTA. Samples were heated in aluminum pans under nitrogen atmosphere at a rate of 10° C. min$^{-1}$.

Dynamic Mechanical Analysis (DMA) experiments were conducted on a TA Instruments DHR-3 equipped with electrically heated 25 mm parallel plates and a nitrogen purged sample chamber. Unless otherwise specified isochronal temperature ramps were conducted for a ramp rate of 1° C./min at a frequency of 1 rad s$^{-1}$ and 1% strain; dynamic strain sweeps at 1 rad s$^{-1}$ were conducted at various temperatures to ensure this was within the linear regime. All data shown are for second sweep cycle after previously cooling the polymer from 180° C. Isothermal frequency sweeps were also collected at 1% strain.

Uniaxial extension tests were conducted at room temperature on a RSA-G2 rheometer (TA Instruments) with a strain rate of 110 mm min$^{-1}$. Samples were prepared by pressing the polymer between teflon sheets at 120° C. to a uniform thickness (~0.5 mm). The sheets were cut using a dog-bone-shaped die to prepare samples with dimensions that were 3.0 mm (w) 7.25 mm (1) 0.5 mm (t). Data for a minimum of 8 repetitions are summarized in Table 1. Due to limitations in the maximum measurable strain set by the instrument, the highly elastic samples could not be stretched to the point of breaking. Smaller dog-bone shaped specimens with dimensions of 1.0 mm (w)×3.0 mm (1)×1.0 mm (t) were used to establish the strain to break in these materials. Data for a minimum of 8 repetitions are summarized in Table 1.

Tensile hysteresis was conducted on a RSA-G2 rheometer (TA Instruments) with microtensile bars at strain rate of 5 mm/min. For this test samples were prepared by pressing the polymer between teflon sheets at 120° C. to a uniform thickness (~0.5 mm). The sheets were cut using a dog-bone-shaped die to prepare samples with dimensions that were 3.0 mm (w) 7.25 mm (1) 0.5 mm (t).

Room Temperature SAXS analysis was performed at the Advanced Photon Source (APS) at Argonne National Laboratory in beamline Sector 12-ID-B. Scattering intensities were monitored using a silicon pixel Pilatus detector. Additional SAXS analysis including determination of ODT temperatures was performed at the University of Minnesota Characterization Facility on a home-built 6-meter instrument operating at a sample distance of 405 cm. The instrument was fitted with a Bruker Hi-Star multi-wire area detector, a Rigaku Ultrex 18 kw generator with copper radiation x-rays of monochromatic wavelength=1.54 Å, and a thermally controlled sample chamber capable of accessing temperatures between −20 and 200° C.

Polymer density was determined using the following method: Glycerol (99%, Riedel-de Haen), ethylene glycol (99% Mallinckrodt) were purchased and used with DI water to prepare several solutions with densities ranging from 1.25 and 1.0 g cm$^{-3}$. A small, bubble-free sample of PMVL ($M_m$=30 kg mol$^{-1}$) was dropped into these solutions at room temperature. The density of the solution in which the sample appeared to achieve neutral buoyancy was taken to be the polymer density; this was determined to be 1.10 g cm$^{-3}$ using a 0.989 cm$^{-3}$ glass micropycnometer previously calibrated using room temperature deionized $H_2O$.

Results

Biosynthesis of MVL. MVL was biosynthesized as described in U.S. Provisional Patent Application No. 61/866,233, filed on Aug. 15, 2013 and U.S. Provisional Patent Application No. 61/813,354, filed on Apr. 18, 2013, and WO 2014/172596A2, published on 23 Oct. 2014, which described among other things, improved production of mevalonate in E. coli and also expanded pathways to synthesize MVL from this precursor. The overall non-natural pathway has three components: (1) overexpression of the mevalonate producing enzymes; (2) introduction of the fungal siderophore proteins to synthesize anhydromevalonolactone (AML); (3) reduction of AML to MVL by enoate reductases.

While directed evolution approaches undoubtedly will improve the aforementioned MVL biosynthetic pathway, a semisynthetic approach for the immediate large-scale production of βMδVL has been developed (as described in U.S. Provisional Patent Application No. 61/866,233, filed on Aug. 15, 2013 and U.S. Provisional Patent Application No. 61/813,354, filed on Apr. 18, 2013, and WO 2014/172596A2, published on 23 Oct. 2014). In this route the fermented mevalonate is first dehydrated to anhydromevalonolactone, then reduced to MVL.

To scale up the production of mevalonate, the E. coli strain carrying genes from L. casei was tested for fermentation in a 1.3 L bioreactor. During the fermentation, the strain achieved a productivity of 2 g L$^{-1}$ h$^{-1}$ mevalonate with the final titer reaching 88 g L$^{-1}$ (Data not shown). The yield for this semibatch fermentation was 0.26 g/g glucose. To prepare anhydromevalonolactone we added sulfuric acid directly to the fermentation broth and heated to reflux to catalyze the dehydration of mevalonate. At a catalyst loading of 10% by volume, 98% of the mevalonate was converted to anhydromevalonolactone with a selectivity of 89%. The resulting anhydromevalonolactone was isolated by solvent extraction using chloroform and hydrogenated to MVL using Pd/C as the catalyst (bulk, room temperature, 350 psi $H_2$, 12 h) at >99% conversion. The crude product was subsequently purified by distillation into polymerization-grade monomer.

Figure 2:
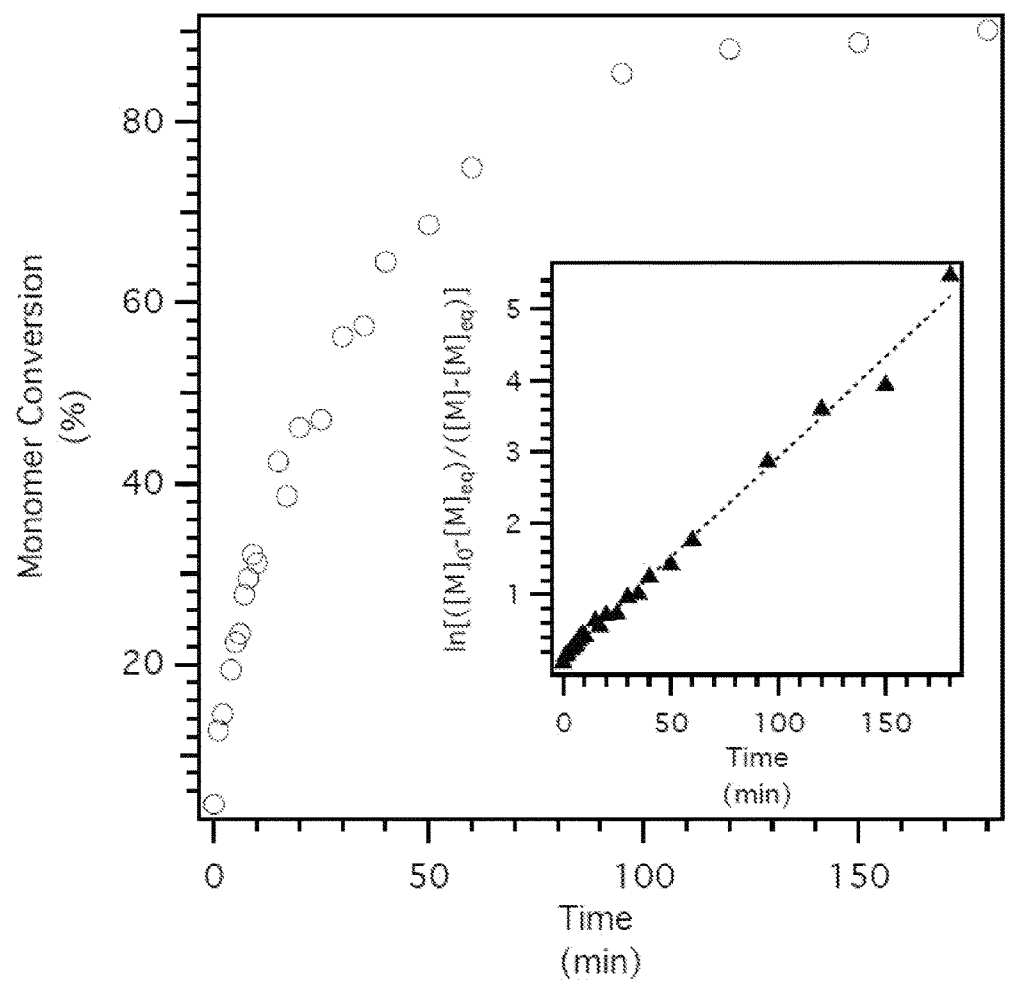
FIG. 2. Conversion over time for bulk polymerization of MδL using TBD as a catalyst and psuedo-first-order kinetics plot for same kinetics data. $[M]_{eq}$ is the experimentally determined equilibrium monomer concentration of MVL. This experiment was conducted at room temperature (18° C.) with [MVL]/[TBD]/[BnOH]=492/1/1.7. The inset shows a pseudo-first-order fit to the data.
Figure 3:
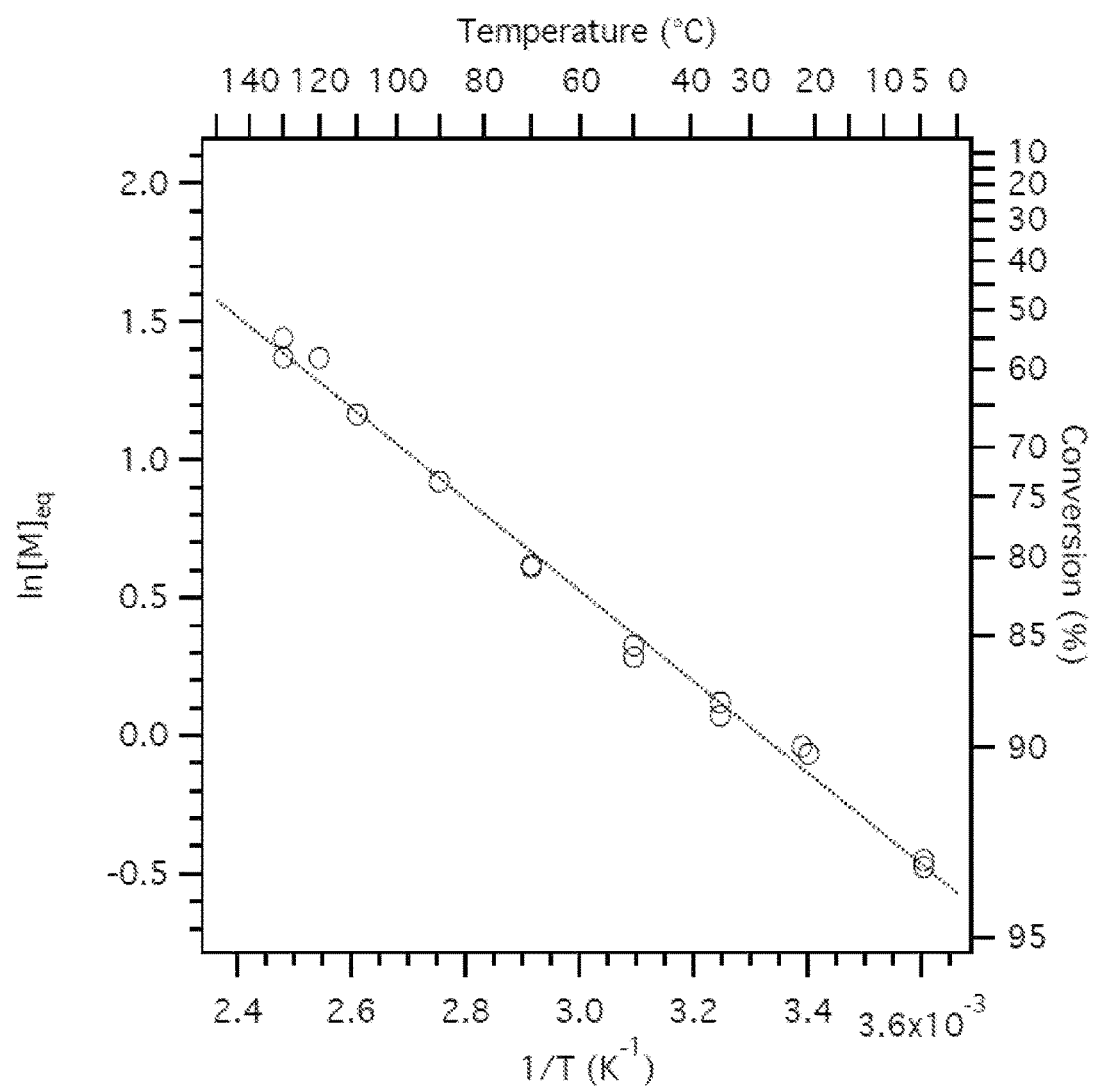
FIG. 3. Thermodynamics of MVL bulk polymerization line shows linear best fit used to determine $\Delta H_p^\circ$ and $\Delta S_p^\circ$ for the bulk polymerization (−13.8±0.3 kJ mol$^{-1}$ and −46±1 J mol$^{-1}$ K$^{-1}$, respectively).

Polymerization of MVL. Based on previous work with alkyl-substituted δ-valerolactones we suspected the ceiling temperature for the polymerization of MVL might be low. To favor high conversion we therefore conducted the polymerizations in bulk monomer at room temperature using the highly active organocatalyst triazabicyclodecene (TBD) (FIG. 1). The addition of TBD to neat MVL in the presence of benzyl alcohol (BnOH) as the initiator ($[MVL]_0/[TBD]_0/[BnOH]_0$=492/1/1.7) resulted in the rapid production of PMVL—within one hour at room temperature (T=18° C.) 75% of the monomer was consumed, within three hours the reaction approached equilibrium (FIG. 2). Determination of the residual monomer concentration over a range of temperatures allowed us to calculate the thermodynamic parameters for this polymerization ($\Delta H_p°$=−13.8±0.3 kJ mol$^{-1}$ and $\Delta S_p°$=−46±1 J mol$^{-1}$ K$^{-1}$); these values correspond to a ceiling temperature ($T_c$) of 227° C. for the polymerization of neat MVL. Practically, the limiting conversion for the bulk polymerization is about 91% and 60% at 18° C. and 120° C., respectively (FIG. 3). At 18° C. with as little as 0.05 wt % TBD, the bulk polymerization is well controlled with the conversion and ratio of monomer to added initiator dictating the molar mass of the polymer (Table 2). Using the diol initiator 1,4-phenylenedimethanol we obtained dihydroxy terminated PMVL.

Figure 4:
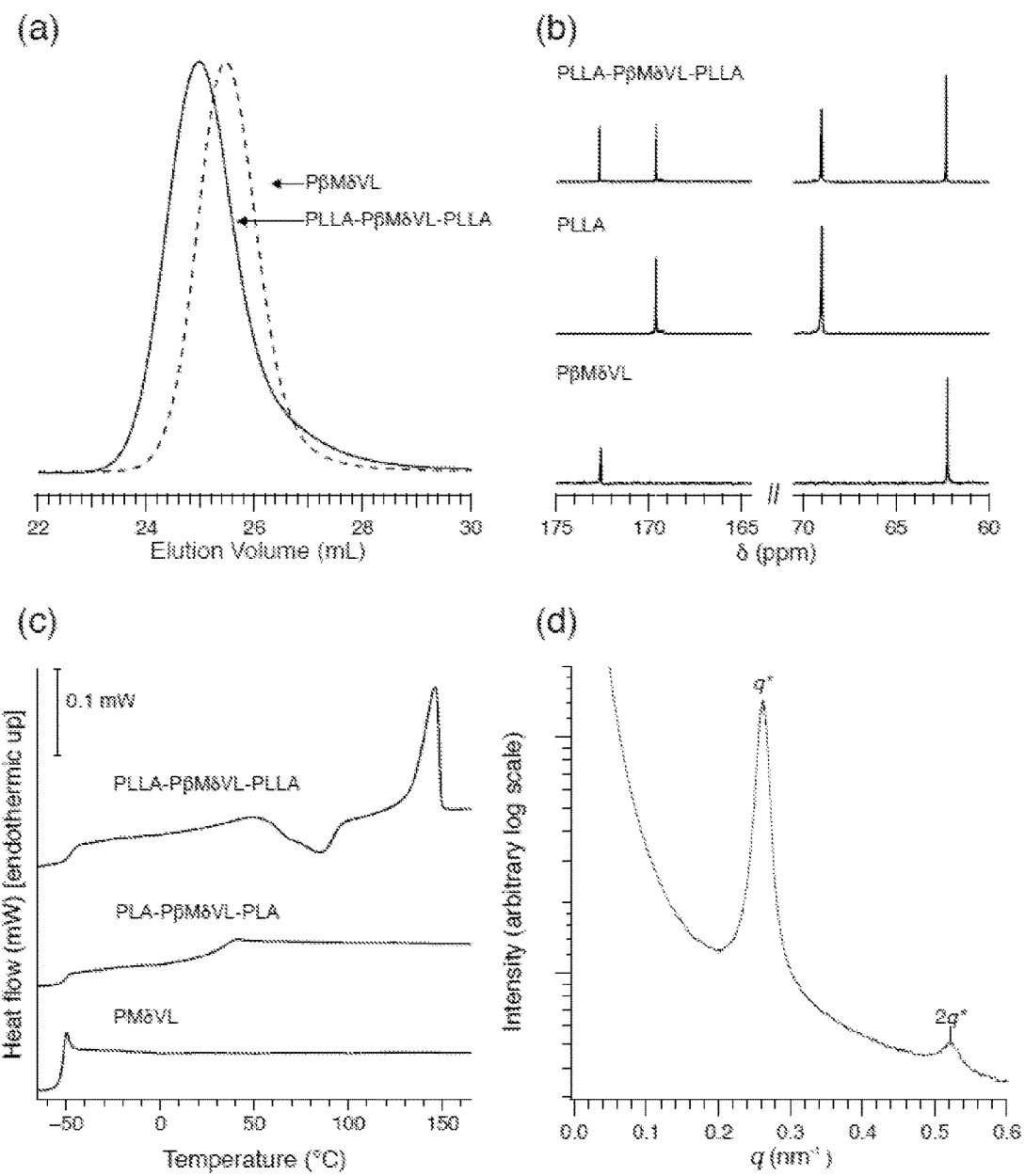
FIG. 4. (a) Overlay of size exclusion chromatography traces obtained from PMVL (20.0 kg mol$^{-1}$) and a corresponding PLLA-PMVL-PLLA (9.1-20.0-9.1 kg mol$^{-1}$) triblock polymer. (b) $^{13}$C NMR spectra obtained from (bottom) PMVL, (middle) PLLA (10.0 kg mol$^{-1}$), and (top) PLLA-PMVL-PLLA (9.1-20.0-9.1 kg mol$^{-1}$). (c) DSC thermograms recorded for (bottom) PMVL and (middle) PLA-PMVL-PLA (16.2-20.0-16.2 kg mol$^{-1}$), and (top) PLLA-PMVL-PLLA (9.1-20.0-9.1 kg mol$^{-1}$). Data were taken while heating at a rate of 5° C. min$^{-1}$ after cooling from 200° C. at the same rate. (d) SAXS pattern recorded at room temperature from PLA-PMVL-PLA (16.2-20.0-16.2 kg mol$^{-1}$). Diffraction peaks at q*=0.185 nm$^{-1}$, 2q*, 3q* and 4q* are consistent with a periodic (d=34 nm) lamellar morphology.

Synthesis and mechanical properties of block copolymers. PMVL is an amorphous aliphatic polyester with a low glass transition temperature ($T_g$=−51° C.). To explore the potential of this rubbery polymer as the soft segment in thermoplastic elastomers we employed dihydroxy terminated PMVL to prepare triblock polymers with poly(lactide) endblocks. This was easily accomplished by adding a solution of (±) or (−)-lactide (LA or LLA) directly to a polymerization of MVL that was near equilibrium. (Alternatively, purified telechelic PMVL (free of residual monomer and catalyst) could be dissolved in a solution of lactide, and the polymerization initiated by addition of TBD.) Although depolymerization can be problematic for PMVL when diluted in the presence of TBD, the conversion of MVL was virtually unchanged before and after the chain extension with lactide, suggesting that the addition of lactide to the end of the PMVL prevents significant depolymerization. Compared to the PMVL macroinitiators, polymers prepared using either extension strategy exhibited expected increases in mass average molar mass ($M_m$) as determined by MALLS-SEC (FIG. 4A). In addition, the $^{13}$C NMR spectra of the resulting triblocks revealed no evidence of significant transesterification between the PMVL and poly(lactide) blocks, consistent with clean formation of the desired ABA triblock architecture (FIG. 4B).

Despite the structural similarity of poly(lactide) and PMVL, P(L)LA-PMVL-P(L)LA triblock polymers readily microphase separate at only moderate molar masses as evidenced by differential scanning calorimetry (DSC) and small angle x-ray scattering (SAXS). Both PLA-PMVL-PLA (from (±)-lactide, LA) and PLLA-PMVL-PLLA (from (−)-lactide, LLA) exhibit separate glass transitions for the midblock and endblock segments by DSC (FIG. 4C). In addition, the SAXS data from these triblocks showed well-defined scattering peaks that correspond to self-assembled nanostructures with principal spacings ranging from 20 to 50 nm (FIG. 4D, Table 3).

Figure 5:
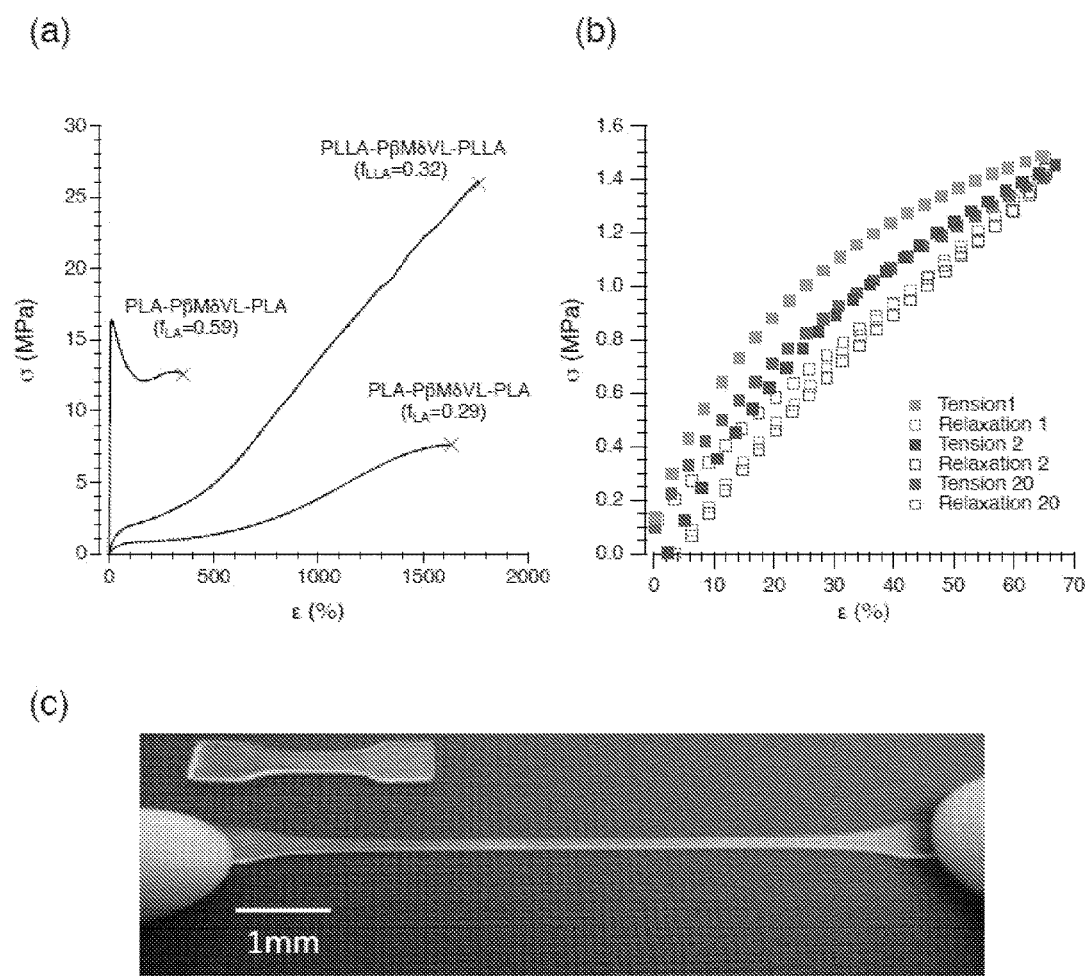
FIG. 5. (a) Representative stress (σ) versus strain (ε) results obtained in uniaxial extension for triblock polymers containing different volume fractions of semicrystalline ($f_{LLA}$) and glassy ($f_{LA}$) blocks. Incorporation of relatively small amounts of the hard block ($f_{LA}$=0.29 and $f_{LLA}$=0.32) results in a soft (elastic modulus E=1.9 and 5.9 MPa, respectively) highly extendable elastic material. Increasing the hard block content ($f_{LA}$=0.59) leads to a stiff (E=229 MPA) and ductile plastic. (b) Stress verses strain response of PLLA-PβMδVL-PLLA (18.6-70.0-18.6 kg mol$^{-1}$) ($f_{LLA}$=0.32) during cyclic loading (1 to 20 cycles) to 67% strain at a rate of 5 mm min$^{-1}$. These results demonstrate nearly ideal elastic behavior with nearly complete recovery of the applied strain. (c) An image illustrating the elastic nature of a PLLA-PβMδVL-PLLA article.

Predictably, the mechanical and thermal properties of these ordered block polymers are influenced by molar mass, tacticity of the poly(lactide) segments, and composition. By changing the endblock from the minority component ($f_{LA}$=0.29) to the majority component ($f_{LA}$=0.59) it is possible to access either elastomers or tough plastics. Moreover, at a fixed composition and molar mass, the use of semi-crystalline PLLA endblocks leads to remarkably strong elastomers that rival commercially available petroleum based block copolymers in terms of recoverability, tensile strength, and ultimate elongation (FIG. 5 and Table 1).

Overview

A semisynthetic approach to MVL from glucose has been developed that relies upon the femenation of mevalonate and subsequent transformation of mevalonate to MVL. The high titer of the fermentation (88 g L$^{-1}$) and the efficiency of the chemical reactions used to produce the final product make the overall process scalable and commercially promising. A non-natural total biosynthetic pathway for the production of MVL has been described, which pathway obviates the need for additional chemical transformations. Optimization of this all-biosynthetic process (i.e., titer and yield comparable to the semisynthetic route) would further reduce the production cost of MVL. This bioderived monomer can be readily converted from the neat state to a rubbery hydroxytelechelic polymer using controlled polymerization techniques at ambient temperature; addition of either (±) or (−)-lactide to a PMVL midblocks leads to well defined ABA triblock polymers. We have shown that the thermal and mechanical properties of these materials can be tuned by controlling molar mass, arcitecture, and endblock tacticity and have specifically demonstrated thermoplastic elastomers with properties similar to commercially available styrenic block polymers. This work lays the foundation for the production of new biobased polymeric materials with a wide range of potential properties and applications.

TABLE 1

$^a$Mechanical properties of Poly(LA-b-MVL-b-LA) Triblocks

| $^a$Sample | $^b$E (MPa) | $^b\sigma_b$ (MPa) | $^b$E$_b$ (%) | $^c$F$_{(L)LA}$ |
|---|---|---|---|---|
| LA-MVL-LA 16.2-20.0-16.2 | 229 ± 54 | 12.5 ± 1.2 | 350 ± 80 | 0.59 |
| LLA-MVL-LLA 9.0-20.0-9.0 | 22 ± 9 | 8.32 ± .61 | 623 ± 40 | 0.44 |
| LA-MVL-LA 9.5-20.0-9.5 | 54 ± 12 | 1.65 ± .91 | 190 ± 30 | 0.46 |
| LLA-MV-LLA 18.6-70.0-18.6 | 5.92 ± .95 | 28 ± 4 | 1720 ± 140 | 0.32 |
| LA-MVL-LA 16.8-70.0-16.8 | 1.93 ± .61 | 9.0 ± 1.1 | 1790 ± 130 | 0.29 |

$^a$Details of the characteristics of these samples are provided in Table S8.
$^b$Determined by uniaxial extension at a constant deformation rate of 110 mm min$^{-1}$.
$^c$Volume fraction of (L)LA blocks determined using densities of 1.248 g cm$^{-3}$ and 1.10 g cm$^{-3}$ for poly(lactide) and poly(δMVL), respectively

TABLE 2

Molar mass control for synthesis of PMVL diol homopolymers

| Sample No. | $^a$M$_n$ Theor. (kg mol$^{-1}$) | $^b$Conversion (%) | $^c$M$_n$ (kg mol$^{-1}$) | $^d$M$_m$ (kg mol$^{-1}$) | $^d$Đ | $^e$T$_g$ (° C.) |
|---|---|---|---|---|---|---|
| 1 | 4.1 | 64.1 | 4.2 | 5.3 | 1.08 | −51 |
| 2 | 4.3 | 79.1 | 4.3 | 4.1 | 1.06 | −50 |
| 3 | 7.2 | 89.0 | 7.2 | 8.3 | 1.08 | −51 |
| 4 | 10.1 | 79.6 | 10.1 | 10.8 | 1.05 | −52 |
| 5 | 12.1 | 90.2 | 12.1 | 11.7 | 1.05 | −52 |
| 6 | 18.4 | 46.0 | 18.7 | 18.1 | 1.05 | −50 |
| 7 | 19.0 | 88.0 | 21.1 | 20.0 | 1.06 | −51 |

TABLE 2-continued

Molar mass control for synthesis of PMVL diol homopolymers

| Sample No. | $^a$M$_n$ Theor. (kg mol$^{-1}$) | $^b$Conversion (%) | $^c$M$_n$ (kg mol$^{-1}$) | $^d$M$_m$ (kg mol$^{-1}$) | $^d$Đ | $^e$T$_g$ (° C.) |
|---|---|---|---|---|---|---|
| 8 | 74.9 | 86.0 | 100.3 | 70.0 | 1.13 | −51 |
| 9 | 94.1 | 89.9 | 85.3 | 64.5 | 1.07 | −49 |

$^a$Conversion adjusted theoretical molar mass calculated using ratio of monomer to initiator and observed conversion.
$^b$Monomer conversion determined using $^1$H NMR of crude sample via comparision of residual monomer methylene signals to polymer methylene proton signals.
$^c$Number average molar mass of polymer sample determined using $^1$H NMR of purified polymer, the degree of polymerization was found by normalizing the spectrum to the initiator methylene protons. M$_n$ determined using this method is likely not accurate for high molecular weight polymers as the endgroup is insignificant compared to the polymer protons.
$^d$Mass average molar mass and dispersity were determined using LS-SEC with the assumption of 100% mass recovery to determine dn/dc of the polymer.
$^e$Glass transition temperatures determined using DSC with a heating ramp rate 5° C. min$^{-1}$, to ensure the samples had the same thermal history data were taken from second heating ramp.

TABLE 3

Characteristics of selected Poly(LA-b-MVL-b-LA) Triblocks

| Sample No. | $^a$Composition | $^b$Lactide (wt %) | $^c$f$_{(L)LA}$ | $^d$T$_g$ (° C.) | $^d$T$_g$ (° C.) | $^d$T$_m$ (° C.) | $^{de}$X (%) | $^f$T$_{ODT}$ (° C.) | $^g$d (nm) |
|---|---|---|---|---|---|---|---|---|---|
| $^h$1 | LA-MVL-LA 2.9-4.9-2.9 | 54 | 0.51 | −13 | — | — | — | Dis. | Dis. |
| 2 | LA-MVL-LA 9.3-18.5-9.3 | 50 | 0.47 | −48 | 32 | — | — | 109 (105) | 22 |
| 3 | LA-MVL-LA 9.5-20.0-9.5 | 49 | 0.48 | −47 | 38 | — | — | 138 (140) | 27 |
| 4 | LLA-MVL-LA 9.0-20.0-9.0 | 47 | 0.44 | −47 | 42 | 134 | 20 | 150 (160) | 30 |
| $^i$5 | LA-MVL-LA 16.2-20-16.2 | 49 | 0.59 | −45 | 33 | — | — | | 33 |
| $^i$6 | LA-MVL-LA 16.8-70.0-16.8 | 32 | 0.29 | −53 | 30 | — | — | | 47 |
| $^i$7 | LLA-MVL-LLA 18.6-70.0-18.6 | 35 | 0.32 | −51 | 43 | 150 | 10 | | 48 |

$^a$Composition calculated from the mass average molar mass of the corresponding midblock determined by LS-SEC and the lactide content of the purified triblock determined by $^1$H NMR.
$^b$weight percent of lactide in triblock determined using $^1$H NMR analysis.
$^c$Volume fraction of (L)LA blocks determined using densities of 1.248 g cm$^{-3}$ and 1.10 g cm$^{-3}$ for poly(lactide) and poly(δMVL), respectively.
$^d$Glass transition temperatures and melting points, and enthalpy of fusion were determined using the second DSC heating ramp at a rate of 5° C. min$^{-1}$ after previously cooling from 200° C. at the same rate.
$^e$Percent crystallinity for the entire triblock was calculated from the enthalpy of fusion and a reference heat of fusion of 94 J/g for the α-form of crystalline PLLA.
$^f$Order to disorder transition temperatures determined by DMA temperature ramps heating a a rate of 1° C. min$^{-1}$ with a constant frequency of 1 rad/s and a strain of 1%. Transition temperatures were also determined using variable temperature SAXS (listed in parentheses). For samples 5, 7, and 8 the transition temperature was above the degradation temperature of the sample.
$^g$Domain spacing calculated from primary SAXS peak at room temperature (20° C.) after heating above the order to disorder transition and annealing in a vacuum oven at 100° C. for a minimum of 12 hours prior to slow cooling to ambient temperature. For samples with order to disorder transitions greater than 180° C. a film was prepared by casting from a solution of chloroform, dried and annealed at 100° C. for 12 hours prior to slow cooling to ambient temperature.
$^h$Sample is disordered by SAXS.
$^i$Order to disorder transition not apparent by SAXS or rheology prior to onset of degradation, likely >180° C.

Example 2

(PLLA-PMVL)$_n$ and (PLA-PMVL)$_n$ Multiblocks

Synthesis: We synthesized PMVL using the bulk batch polymerization of MVL with catalytic DPP (diphenyl phosphonic acid), or TBD. HCl (in ether) is also an effective catalyst. 1,4 Benzene dimethanol (BDM) was added to control the molar mass and functionality. Although a broadening of dispersity was observed for high molar mass polymers, (M$_n$>100 kg mol$^{-1}$), low to moderate molar mass polymers (5>M$_n$<100 kg mol$^{-1}$) exhibited narrow dispersities (1.05≥Đ ≤1.15). The number average molar masses determined from $^1$H NMR analyses were in fair agreement with both the theoretical values and those ascertained using size exclusion chromatography with a multi-angle laser light scattering detector (MALLS-SEC).

PLA-PMVL-PLA and PLLA-PMVL-PLLA triblocks were synthesized via chain extension of dihydroxy telechelic PMVL with (±)-lactide or (−)-lactide. Two different synthetic methods have been used: 1.) Lactide monomer dissolved in dichloromethane or toluene can be added directly to a living (TBD-catalyzed) PMVL at equilibrium. 2.) Lactide can be added to PMVL in the melt or in toluene using Sn(oct)$_2$ as a catalyst. There is no evidence of depolymerization or transesterification between the PMVL and PLA blocks when either method is used.

Multiblocks can be synthesized conveniently from dihydroxy telechelic PLA-PMVL-PLA triblock using a coupling approch. Coupling agents that have been used successfully for this purpose are diacid chlorides (for example terephthalic acid and sebacoyl chloride), diisocyantes (for example methylene diisocyante), and divinyl adipate.

Because these coupling reactions are all step growth polymerizations the resulting multiblocks have a broad dispersity. Here we define coupling efficiency as the ratio the molar mass of the multiblock to the molar mass of the parent triblock as determined by size exclusion chromatography. Coupling efficiencies for the methods described here range from 1.1 to 4.0 depending on polymer molar mass and stiociometry of coupling agent to alcohol groups on the polymer. This efficiency is basically correlated to the number average degree of polymerization for the multiblock. Most typically the coupling efficiency is about 2.0. These approaches are summarized in the examples below.

Procedure 1. One pot synthesis of (PMVL-PLA)$_n$ using diacid chloride: In a glovebox with a nitrogen atmosphere 94.4 miligrams of 1,4-benzene dimethanol was added to a pressure vessel containing 20.0385 grams MVL. The solution was stirred until the initiator was fully dissolved then 49.1 milligrams of TBD were added. After one hour an alioquat was removed for characterization and (±)-lactide (8.3716 g) in toluene (120 ml) was added. The polymerization was stirred for 20 minutes and a second aliquot was removed. Pyridine (50 ml) and sebacoyl chloride (142 µl) were added and the solution stirred for 1 hour. The polymer was concentrated in vacuo then precipitated in methanol to yield (PLA-PMVL)$_n$ (25.9 g, 92%). PMVL: $M_{n(PS)}$=51.5 Đ =1.2; PLA-MVL-PLA: $M_{n(PS)}$=63.8, Đ =1.12; (PLLA-PMVL)$_{1.9}$: $M_{n(PS)}$=119, Đ =1.66

Figure 6:
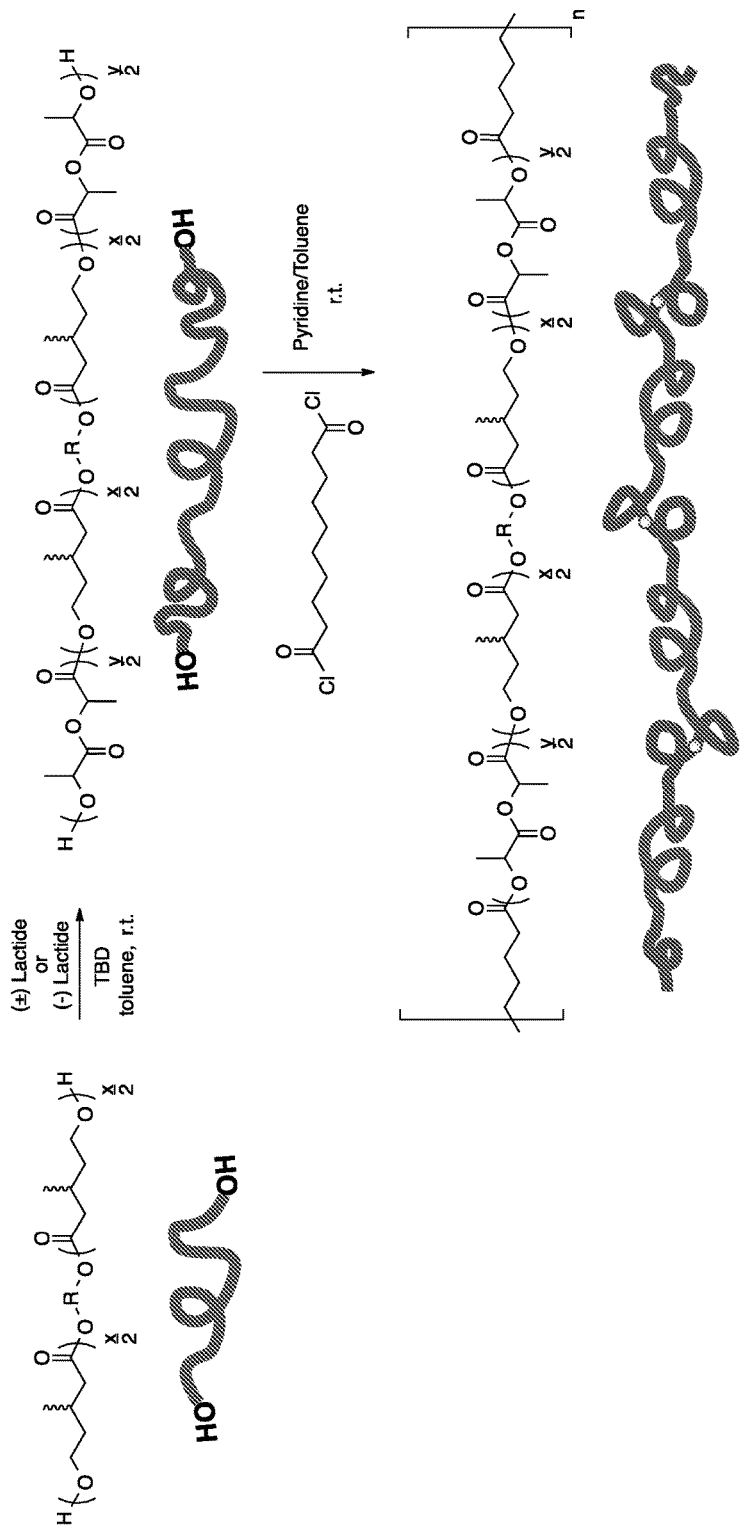
FIG. 6 shows a synthesis scheme of (PLLA-PMVL)$_n$ and (PLA-PβMδVL)$_n$ Multiblocks using a diacid chloride coupling approach
Figure 7:
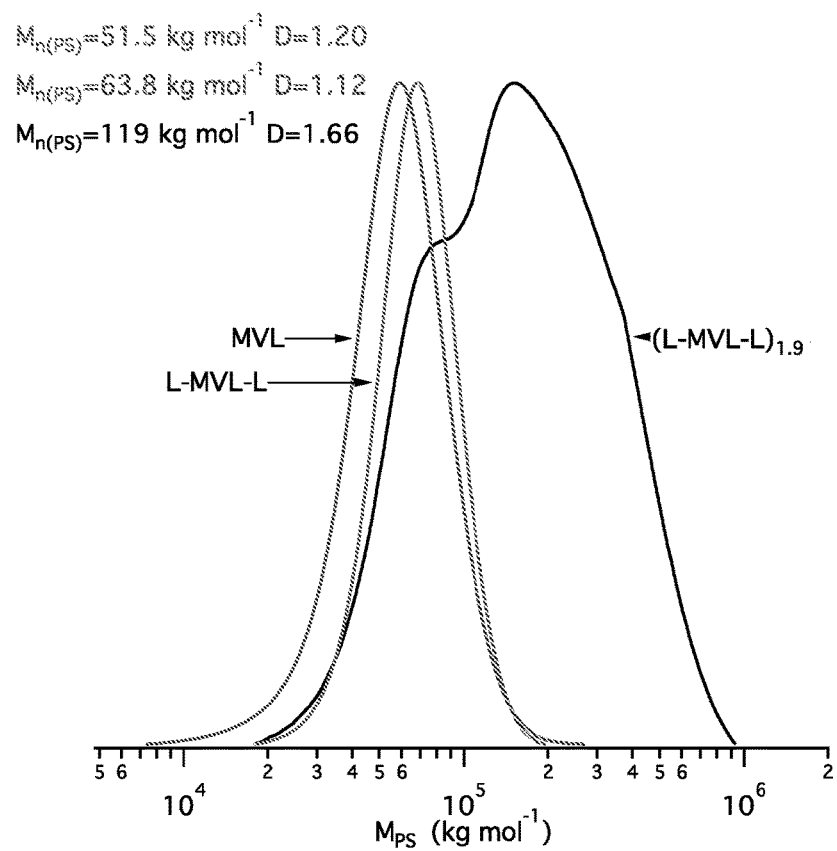
FIG. 7 shows a representative example of size-exclusion chromatograms for a telechelic MVL, PLA-PMVL-PLA, and the corresponding (PMVL-PLA)$_n$ multiblock prepared using diacid chloride coupling approach.

FIG. 6 shows a synthesis scheme of (PLLA-PβMδVL)$_n$ and (PLA-PβMδVL)$_n$ Multiblocks using a diacid chloride coupling approach FIG. 7 shows a representative example of size-exclusion chromatograms for a telechelic MVL, PLA-PMVL-PLA, and the corresponding (PMVL-PLA)$_n$ multiblock prepared using diacid chloride coupling approach.

Procedure 2. Synthesis of (PMVL-PLLA)$_n$ using diisocyanate: (−)-lactide (5.0084 grams), PMVL (5.0 grams), and Sn(oct)$_2$ (26.8 ml) were dissolved in toluene (35 ml) and heated. After 1½ hours the reaction was cooled and an alioquot removed for characterization. Under a constant stream of argon 85.0 mg of MDI was added as quickly as possible. The vessel was capped, heated to 100° C. and stirred for 1 h. The polymer was then cooled and precipitated in methanol to yield (PLLA-PMVL)$_n$ (9.5 grams, 95%). PMVL: $M_{n(PS)}$=29.9, Đ =1.09; PLLA-MVL-PLLA: $M_{n(PS)}$=53.8, Đ =1.11; (PLLA-PMVL)$_{2.4}$: $M_{n(PS)}$=125.4, Đ =2.17

Figure 8:
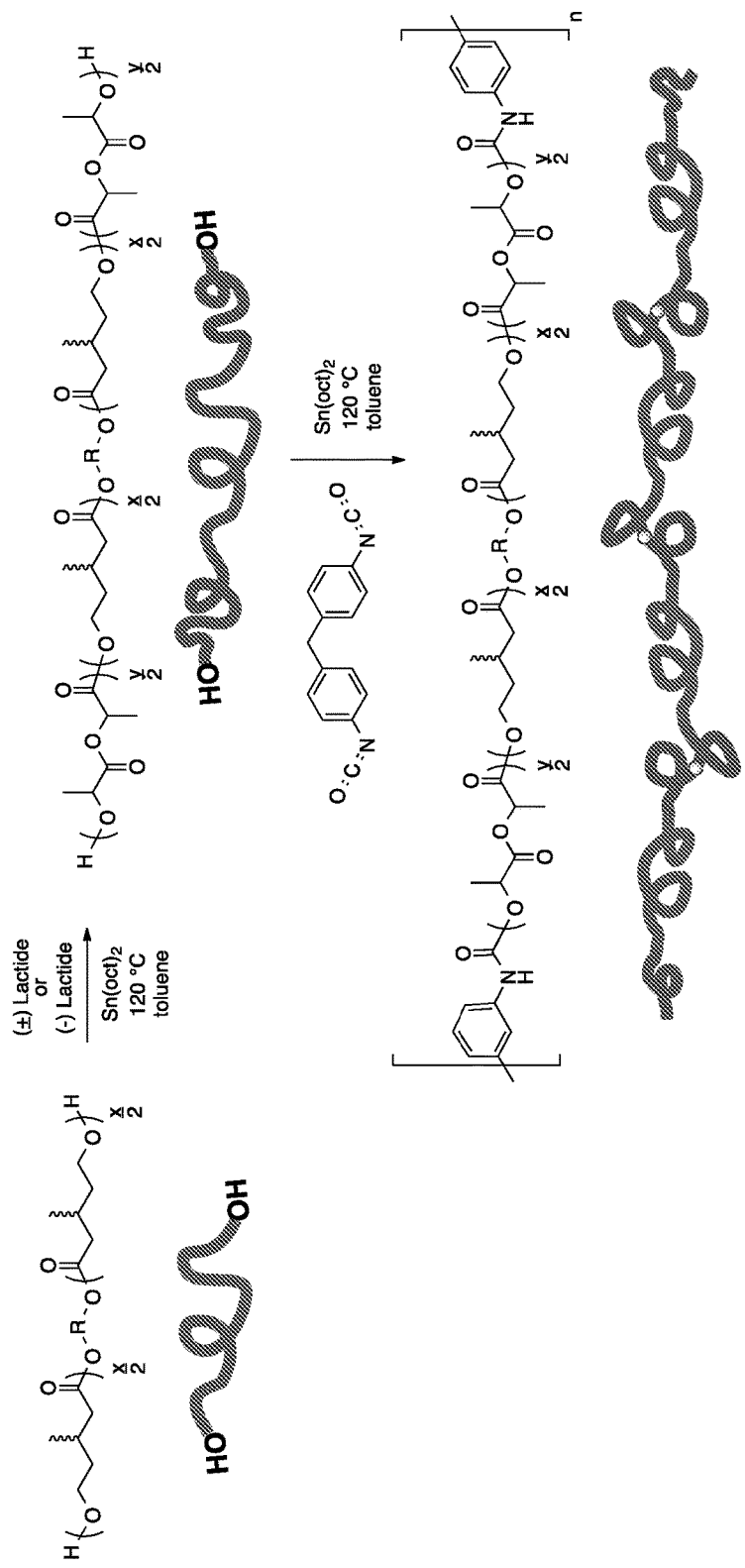
FIG. 8 shows a synthesis scheme of (PLLA-PMVL)$_n$ and (PLA-PβMδVL)$_n$ Multiblocks using an isocyanate coupling approach
Figure 9:
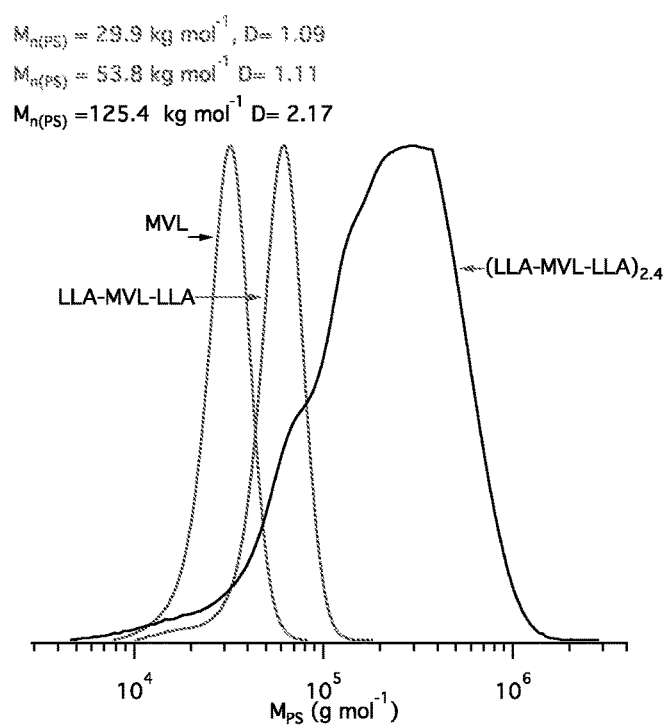
FIG. 9 shows a representative example of size-exclusion chromatograms for a telechelic MVL, PLA-PMVL-PLA, and the corresponding (PMVL-PLA)$_n$ multiblock prepared using diisocyanate coupling approach.

FIG. 8 shows a synthesis scheme of (PLLA-PβMδVL)$_n$ and (PLA-PβMδVL)$_n$ Multiblocks using an isocyanate coupling approach FIG. 9 shows a representative example of size-exclusion chromatograms for a telechelic MVL, PLA-PMVL-PLA, and the corresponding (PMVL-PLA)$_n$ multiblock prepared using diisocyanate coupling approach.

Figure 10:
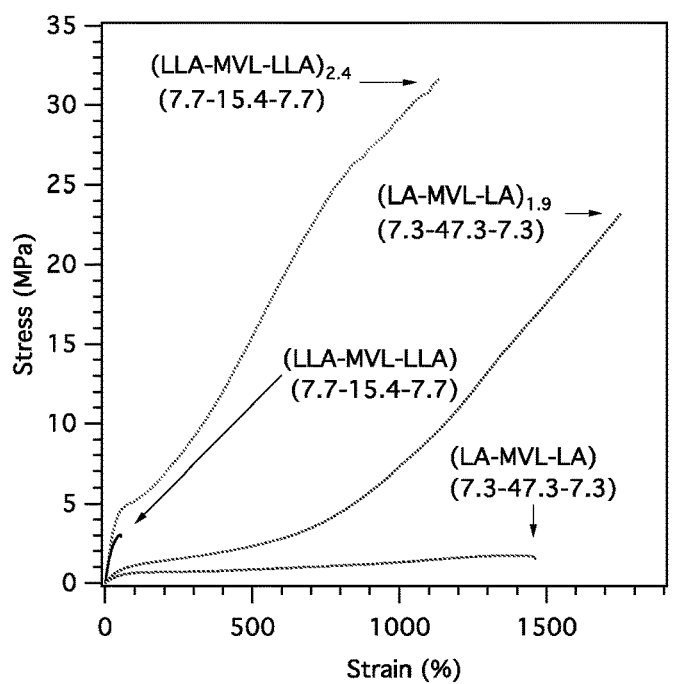
FIG. 10 shows a representative examples of room temperature uniaxial extension of (PLLA-PMVL-PLLA)$_n$ and (PLA-PMVL-PLA)$_n$ multiblock elastomers and parent triblocks. Experiments were conducted with constant crosshead velocity of 50 mm min$^{-1}$. These samples were synthesized using the diisocyante coupling approach described in Example Procedure 2.

FIG. 10 shows a representative examples of room temperature uniaxial extension of (PLLA-PMVL-PLLA)$_n$ and (PLA-PMVL-PLA)$_n$ multiblock elastomers and parent triblocks. Experiments were conducted with constant crosshead velocity of 50 mm min$^{-1}$. These samples were synthesized using the diisocyante coupling approach described in Procedure 2.

Example 3

PLLA-PMVL-PLLA/PDLA-PMVL-PDLA Sterocomplexes

We synthesized polyβ-methyl-δ-valerolactone (hereafter PMVL) using the bulk batch polymerization of β-methyl-δ-valerolactone with catalytic triazabicyclodecene (TBD). An initiator, 1,4 Benzene dimethanol (BDM) was added to control the molar mass and functionality. The number average molar masses determined from $^1$H NMR analyses were in fair agreement with both the theoretical values and those ascertained using size exclusion chromatography with a multi-angle laser light scattering detector (MALLS-SEC). Since both adventitious initiation and transesterification are minimized, linear telechelic polymers can be synthesized with good control over molar mass, with low dispersity, and dual functionality (i.e., one endgroup per chain end).

PLLA-PMVL-PLLA, PDLA-PMVL-PDLA, and PLA-PMVL-PLA triblocks are by adding a solution of lactide (either (+)/L lactide or (−)/L lactide) monomer to dihydroxy telechelic polyβ-methyl-δ-valerolactone in the presence of catalytic TBD. Alternatively the triblock synthesis can be accomplished in the melt or in toluene using Sn(oct)$_2$ as a catalyst. There is no evidence of significant transesterification between the PMVL and PLA blocks when these conditions are used. The tacticity of the PLA blocks is controlled by changing the optical purity of the lactide monomer. When racemic (±)-lactide is used the endblocks are atactic PLA. When optically pure (+)-lactide or (−)-lactide is added the endblocks are, respectively, isotactic PDLA or PLLA. PLLA-PβMδVL-PLLA/PDLA-PβMδVL-PDLA sterocomplexes are easily prepared by blending PLLA-PMVL-PLLA and PDLA-PMVL-PDLA together. This is accomplished by dissolving both polymers in toluene. The solvent is slowly evaporated at room temperature to yield a film of the sterocomplex. This is procedure is summarized in FIG. 11.

Figure 11:
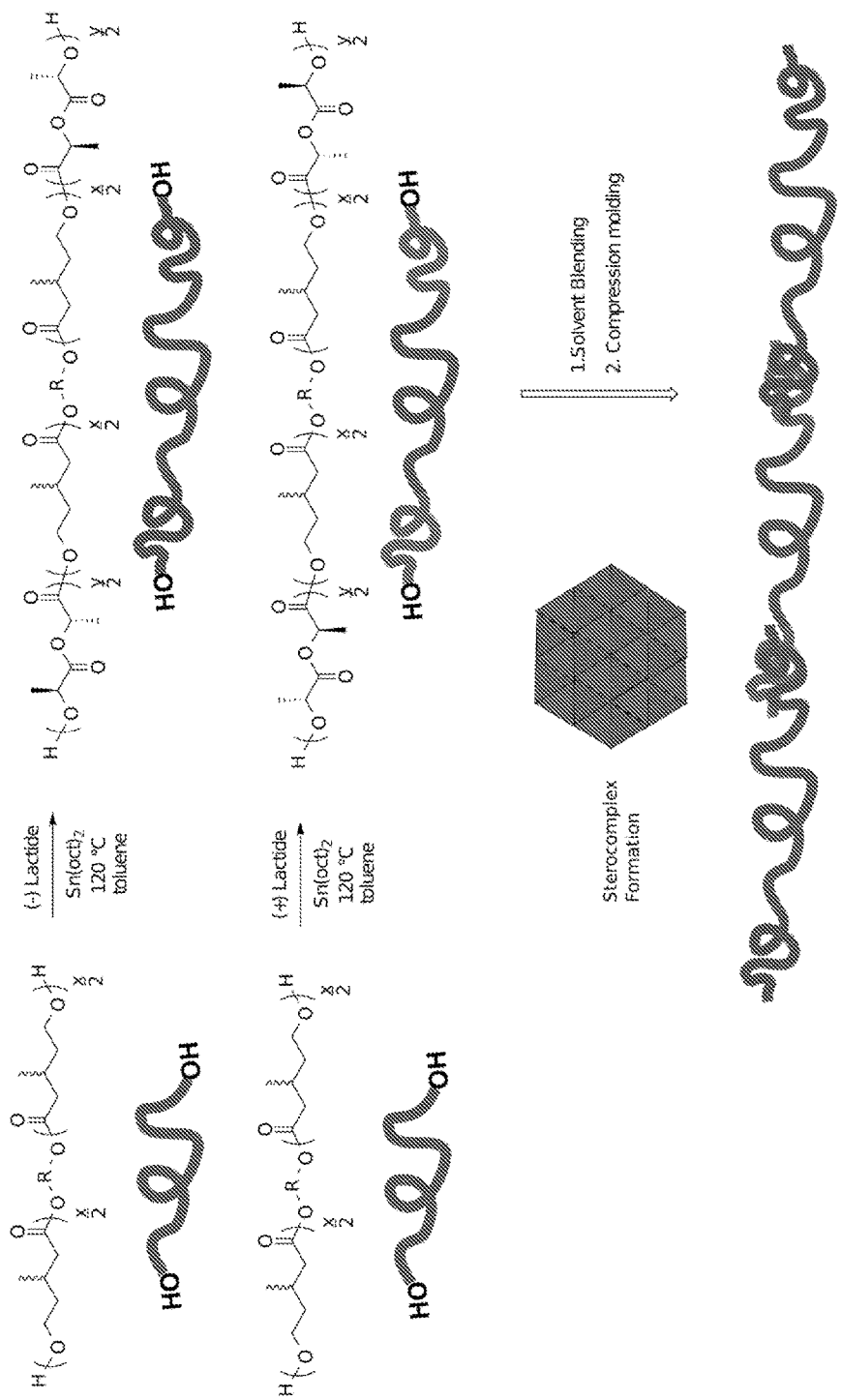
FIG. 11 shows PLLA-PMVL-PLLA/PDLA-PMVL-PDLA sterocomplexes.

FIG. 11 shows PLLA-PβMδVL-PLLA/PDLA-PβMδVL-PDLA sterocomplexes.

Example Procedures: Synthesis of PMVL: In a glovebox with a nitrogen atmosphere 63.8 miligrams of 1,4-benzene dimethanol was added to a pressure vessel containing 40.2172 grams MVL. The solution was stirred until the initiator was fully dissolved then 122.0 milligrams of TBD were added. The pressure vessel was capped, removed from the glovebox, then stirred at room temperature. After 40 minutes the polymerization was quenched with benzoic acid, diluted with dichloromethane, precipitated in methanol, and dried. PMVL was obtained as a clear viscous polymer in 95% yield. MALLS-SEC: $M_N$=62.2, $M_W$=70.0, Đ =1.13

Synthesis of PDLA-PMVL-PDLA: In a glovebox with a nitrogen atmosphere 10.0 grams of PMVL, 5.1422 grams (+)-Lactide, and 40 milliliters of dichloromethane were added to a round-bottomed flask. After the contents were fully dissolved 25.0 milligrams of TBD were added. The polymerization was stirred at room temperature; after 10 minutes the catalyst was quenched with benzoic acid. The polymer then precipitated in methanol and dried. PDLA-PMVL-PDLA was obtained in 97% yeild. MALLS-SEC: $M_N$=76.9, $M_W$=91.5, Đ =1.19; $^1$HNMR: 29.1 mol % PDLA; DSC: $T_g$=−51.8° C., $T_g$=40.1° C., $T_m$=144.1° C., X=38% (percent crystallinity)

Synthesis of PLLA-PMVL-PLLA: In a glovebox with a nitrogen atmosphere 10.0 grams of PMVL, 5.9416 grams (−)-Lactide, and 40 milliliters of dichloromethane were added to a round-bottomed flask. After the contents were fully dissolved 26.0 milligrams of TBD were added. The polymerization was stirred at room temperature; after 10 minutes the catalyst was quenched with benzoic acid. The polymer then precipitated in methanol and dried. PLLA-PβMδVL-PLLA was obtained in 94% yeild. MALLS-SEC: $M_N$=89.3, $M_W$=104.3, Đ =1.17; $^1$HNMR: 29.6 mol % PLLA; DSC: $T_g$=−51.8° C., $T_g$=43.0° C., $T_m$=150.0° C., X=29%

Solvent blending: In a pressure vessel 2.5 grams PDLA-PMVL-PDLA and 2.5 grams PLLA-PMVL-PLLA were stirred in toluene at 120° C. When fully dissolved the solution was cast into a Teflon beaker. The solvent was slowly evaporated over a 40 hour period. residual toluene was removed in vacuo prior to characterization. $^1$HNMR: 29.4 mol % PLLA/PDLA; DSC: $T_g$=−51.3° C., $T_m$=188.3° C., X=39%

Thermal Properties: Whereas PLA-PMVL-PLA synthesized using racemic lactide is fully amorphous PLLA-PMVL-PLLA, and PDLA-PMVL-PDLA are semicrystalline. The melting temperature of the polylactide domains depends on the molar mass and composition of the polymer. The melting temperature of the sterocomplex (sc) is higher, nearly 200° C.

Figure 12A:
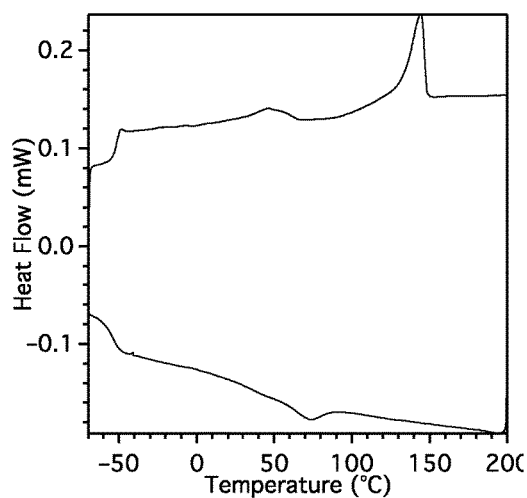
FIGS. 12A-B show DSC thermograms for PLLA-PMVL-PLLA (A) and sc-PMVL-Psc (B). To ensure consistent thermal histories both samples were first heated to 200 and 230° C., respectively. The samples were cooled to −60° C. at a rate of 5° C. min$^{-1}$ and reheated at same rate.
Figure 12B:
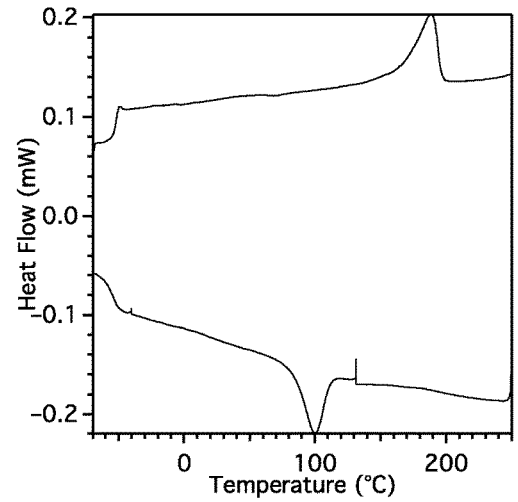

FIGS. 12A-B show DSC thermograms for PLLA-PMVL-PLLA (A) and sc-PMVL-Psc (B). To ensure consistent thermal histories both samples were first heated to 200 and 230° C., respectively. The samples were cooled to −60° C. at a rate of 5° C. min$^{-1}$ and reheated at same rate.

Figure 13A:
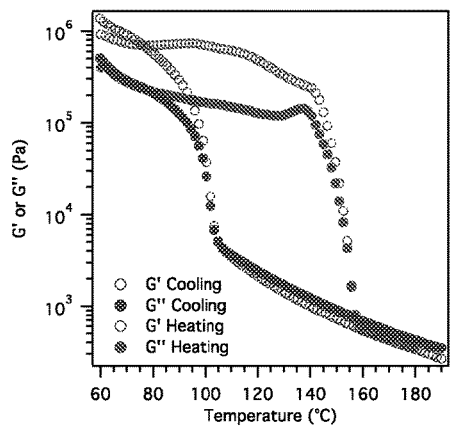
FIGS. 13A-B show DMA isochronal temperature ramps for PLLA-PMVL-PLLA (A) and sc-PMVL-Psc (B). To ensure consistent thermal histories both samples were first heated to 200 and 230° C., respectively. The samples were cooled to 60° C. at a rate of 5° C. min$^{-1}$ and reheated at same rate. The data shown are for the first cooling ramp and second heating ramp.
Figure 13B:
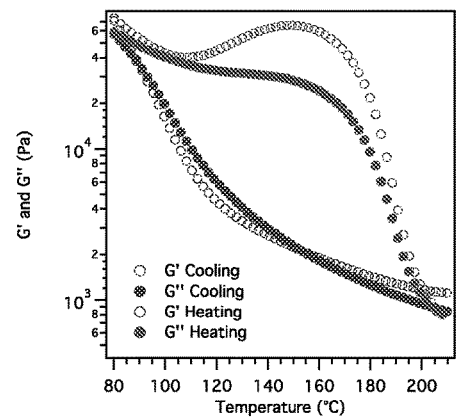

FIGS. 13A-B show DMA isochronal temperature ramps for PLLA-PMVL-PLLA (A) and sc-PMVL-Psc (B). To ensure consistent thermal histories both samples were first heated to 200 and 230° C., respectively. The samples were cooled to 60° C. at a rate of 5° C. min$^{-1}$ and reheated at same rate. The data shown are for the first cooling ramp and second heating ramp.

Tensile Properties: The tensile properties of PLLA-PMVL-PLLA and sc-PMVL-Psc are compared to PLA-PMVL-PLA in FIG. 4. At fixed PLA content and molar mass the PLLA-PβMδVL-PLLA triblocks exhibit significant increases in stress at break compared to PLA-PMVL-PLA. The tensile properties of sc-PMVL-sc are similar to PLLA-PβMδVL-PLLA.

Figure 14:
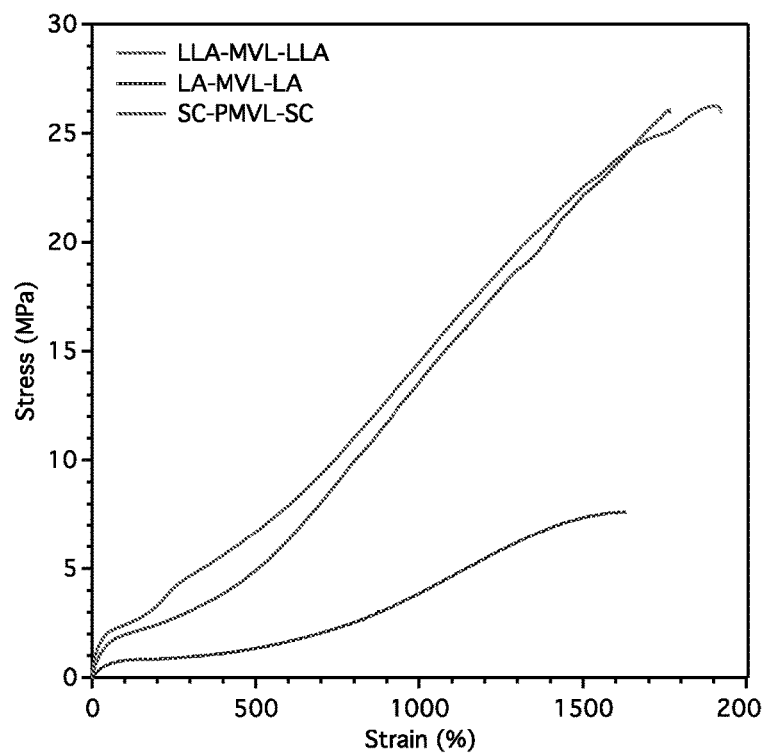
FIG. 14 shows representative examples of room temperature uniaxial extension of PLLA-PMVL-PLLA, sc-PMVL-sc, and PLA-PMVL-PLA triblock elastomers. Experiments were conducted with constant crosshead velocity of 50 mm min$^{-1}$.

FIG. 14 shows representative examples of room temperature uniaxial extension of PLLA-PMVL-PLLA, sc-PMVL-sc, and PLA-PMVL-PLA triblock elastomers. Experiments were conducted with constant crosshead velocity of 50 mm min$^{-1}$. For each sample, average and standard deviation of a minimum of 10 specimens is reported in Table 4.

TABLE 4

Tensile properties of PLLA-PMVL-PLLA, sc-PMVL-sc, and PLA-PMVL-PLA.

| Sample | $E_Y$ (MPa) | $\sigma_b$ (%) | $\varepsilon_b$ (%) |
|---|---|---|---|
| PLA-PMVL-PLA (0.29) | .93 ± 0.6 | 9.1 ± 1.1 | 90 ± 130 |
| PLLA-PMVL-PLLA (0.31) | 5.9 ± 1.0 | 28 ± 4 | 20 ± 140 |
| sc-PMVL-sc (0.31) | 5.8 ± 0.8 | 27 ± 2 | 50 ± 260 |

Samples were tested at room temperature with a constant crosshead velocity of 50 mm min$^{-1}$. Volume fractions were calculated using room temperature densities of 1.1 and 1.248 g cm$^{-3}$ for PMVL and PLA, respectively. Data reported are the average and standard deviation of a minimum of 10 samples.

Example 4

P(βMδVL)$_n$ Polyurethanes

We synthesized low molar mass telechelic PMVL diol prepolymers via the bulk batch polymerization of MVL with catalytic diphenyl phosphonic acid (DPP) or HCl in ether. An initiator, 1,4 Benzene dimethanol (BDM) or 1,4 butane diol (BD) was added to control the molar mass and functionality. Because BDM is only moderately soluble in MVL, BD is preferred when the target molar mass is <2.0 kg mol$^{-1}$. At moderate catalyst loadings ([MVL]/[DPP]=500) the polymerization reaches equilibrium within a few hours. Residual MVL and catalyst are removed from the polymer by washing with basic water.

We used these low molar mass preopolymers to synthesize PMVL polyurethanes in a two-step method. First an isocyanate terminated PMVL is synthesized by adding the prepolymer diol to a solution of excess diisocyante (e.g. methylene diphenyl diisocyanate, isophorone diisocyanate, or L-lysine diisocyanate) in dimethylacetamide (DMAC). A diol chain extender (e.g. 1,3 propane diol or 1,4 butane diol) is then added and the reaction stirred for 10 hours. The polymer is precipitated in methanol to isolate the polyurethane. Both steps of this synthesis are catalyzed by Sn(oct)$_2$.

Procedure: PMVL diol preopolymer (15.0 grams, 6.27 mmol) was added to a solution of methylene diphenyl diisocyanate (MDI) (6.5865 grams, 26.3 mmoles) and Sn(oct)$_2$ (120 mg, 0.479 mmol) in dry dimethylacetamide (130 ml). The solution was stirred for ½ hour at 70° C. and propane diol (1.42 ml, 19.8 mmol) was added. The polymer was stirred 10 hours at 70° C., cooled, diluted with acetone, precipitated in methanol, and dried. The product, was obtained in 88% yield. The polyurethane, PMVL-PMDM2230 (0.4) was compression molded at 210° C. to prepare a plaque, this was cut with a dog-bone shaped die prepare tensile bars.

Figure 15:
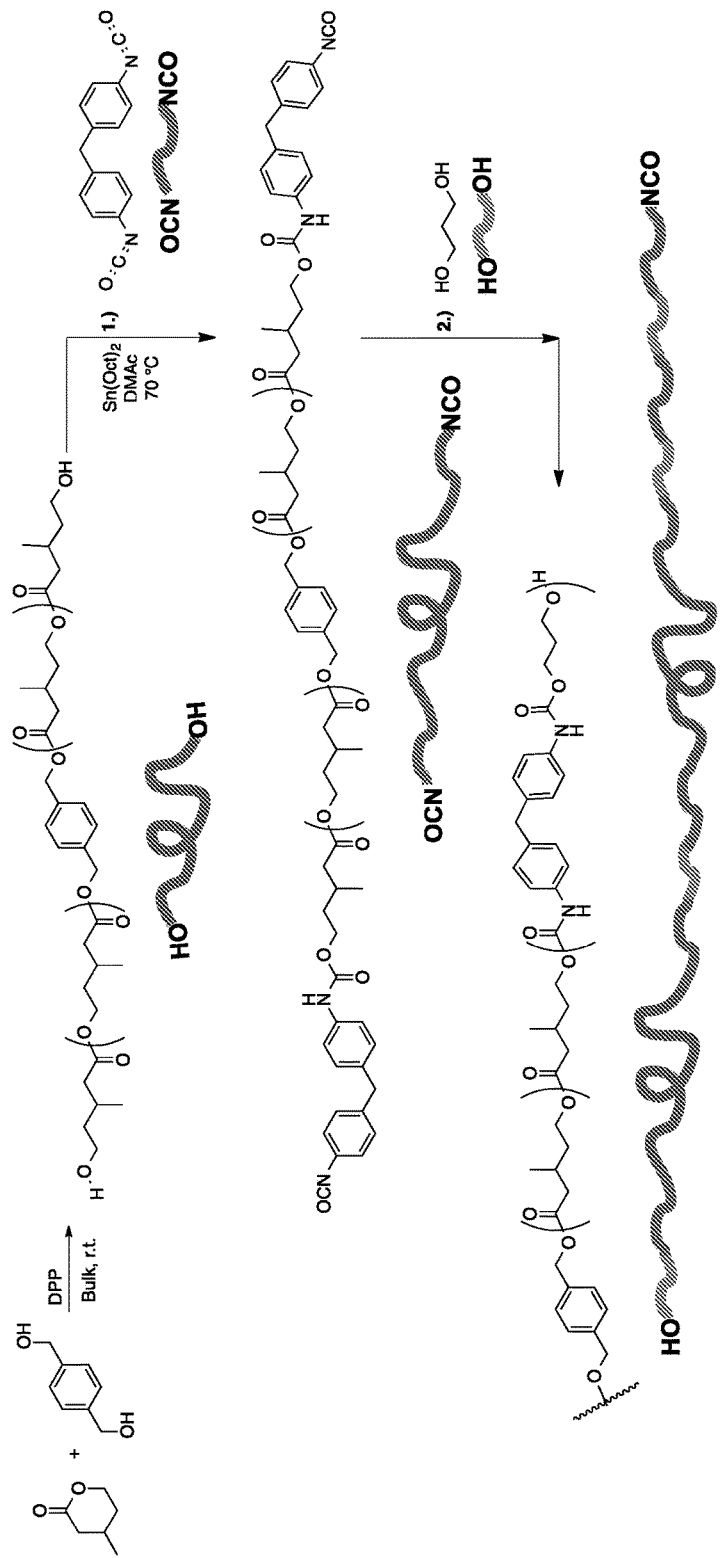
FIG. 15 shows synthesis of PβMδVL polyurethanes using methylene diphenyl diisocyanate

FIG. 15 shows synthesis of PMVL polyurethanes using methylene diphenyl diisocyanate Thermal Properties: Whereas PMVL is amorphous with a low glass transition temperature, PMVL polyurethanes are semicrystalline with a melting temperature of approximately 200° C. A DSC thermogram showing the thermal properties of a PMVL polyurethane and the corresponding PMVL preopolymer are shown in FIG. 2.

Figure 16:
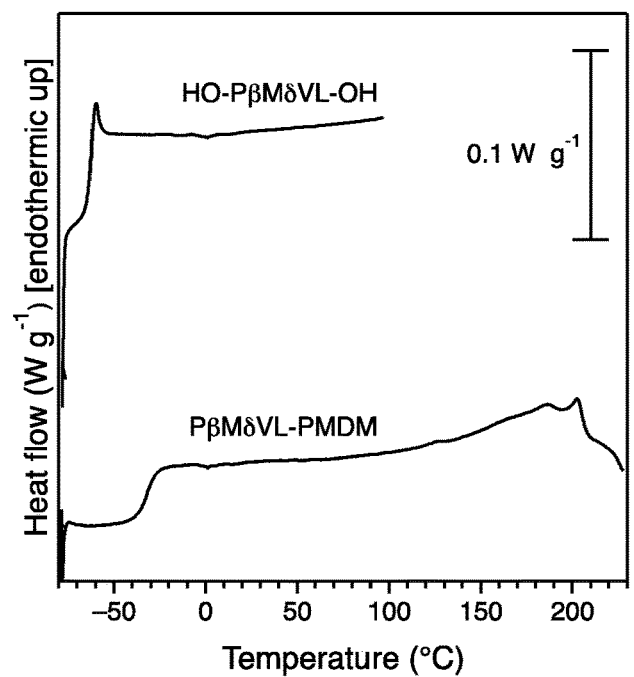
FIG. 16 shows DSC thermograms of PMVL and PMVL polyurethane synthesized using the example procedure 1. To ensure consistent thermal histories both samples were first heated to 100 and 250° C., respectively. The samples were cooled to −70° C. at a rate of 5° C. min$^{-1}$ and reheated at same rate. HO-PMVL-OH (2.23 Kg mol$^{-1}$) T$_g$=−62.5; PMVL-PMDM2230 (0.4) T$_g$=−31.5° C., T$_m$=202.6 (ΔH=9.98 J g$^{-1}$).

FIG. 16 shows DSC thermograms of PMVL and PMVL polyurethane synthesized using the example procedure 1. To ensure consistent thermal histories both samples were first heated to 100 and 250° C., respectively. The samples were cooled to −70° C. at a rate of 5° C. min$^{-1}$ and reheated at same rate. HO-PMVL-OH (2.23 Kg mol$^{-1}$) $T_g$=−62.5; PMVL-PMDM2230 (0.4) $T_g$=−31.5° C., $T_m$=202.6 (ΔH=9.98 J g$^{-1}$).

Figure 17:
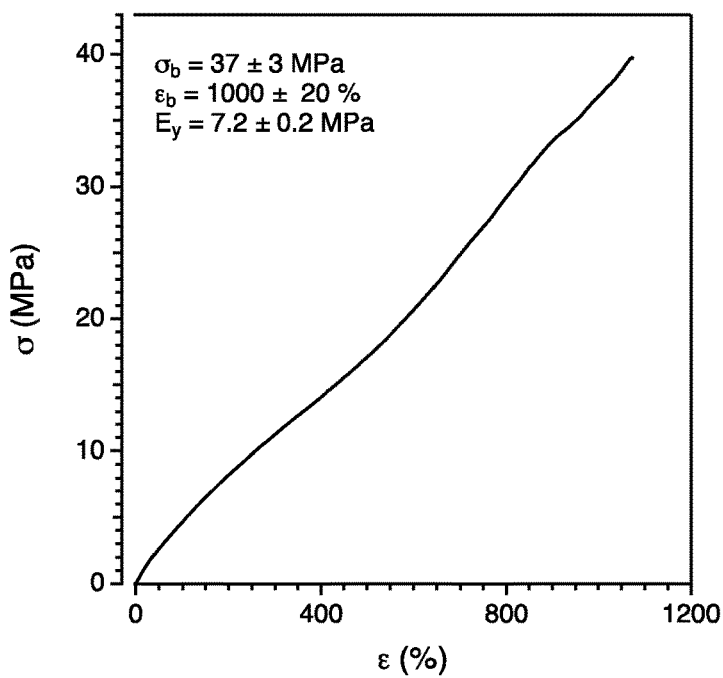
FIG. 17 shows representative tensile data for a PMVL polyurethane PMVL-PMDM2230 (0.4) synthesized example procedure above. Experiments were conducted with constant crosshead velocity of 60 mm min$^{-1}$. Data in the inset are the average and standard deviation of 5 specimens.

FIG. 17 shows representative tensile data for a PMVL polyurethane PMVL-PMDM2230 (0.4) synthesized example procedure above. Experiments were conducted with constant crosshead velocity of 60 mm min$^{-1}$. Data in the inset are the average and standard deviation of 5 specimens.

Figure 18:
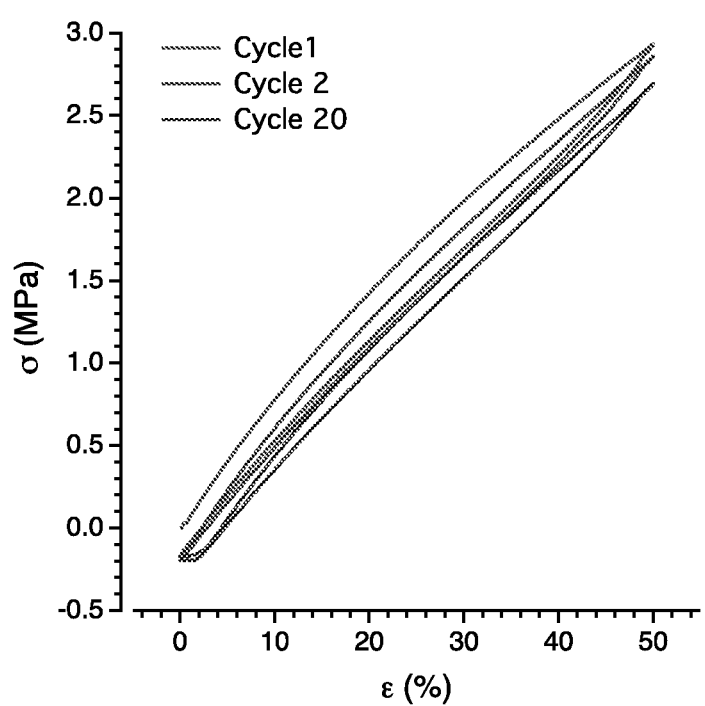
FIG. 18 shows representative data for hysteresis test of PMVL polyurethane PMVL-PMDM2230 (0.4). The test is for 20 cycles of loading and unloading with crosshead velocity of 60 mm min$^{-1}$ with no recovery time between cycles.

FIG. 18 shows representative data for hysteresis test of PMVL polyurethane PMVL-PMDM2230 (0.4). The test is for 20 cycles of loading and unloading with crosshead velocity of 60 mm min$^{-1}$ with no recovery time between cycles.

What is claimed is:

1. A block copolymer comprising:
   a poly((β-methyl-δ-valerolactone) (PMVL) block, wherein the block copolymer has a $^{14}C/^{12}C$ ratio greater than zero.

2. A block copolymer according to claim 1, wherein the PMVL block has a mass average molar mass ($M_w$) of 0.25 kDa or greater.

3. A block copolymer according to claim 1, further comprising a second polymer block having a glass transition temperature 10° C. or more greater than the glass transition temperature of the PMVL block.

4. A block copolymer according to claim 3, wherein the second block has a glass transition temperature of about 30° C. or greater.

5. A block copolymer according to claim 3, wherein the second block has a glass transition temperature of about 50° C. or greater.

6. A block copolymer according to claim 3, wherein the second block is a crystalline or semi-crystalline block at about 23° C.

7. A block copolymer according to claim 1, further comprising a second block formed from a polymer selected from the group consisting of polylactic acid, polyhydroxybutyrate, polybutylene succinate and polyurethane.

8. A block copolymer according to claim 1, further comprising a second block formed from polylactic acid or polyhydroxybutyrate.

9. A block copolymer according to claim 1, further comprising a second block formed from polylactic acid.

10. A block copolymer according to claim 1, further comprising a second block, wherein the PMVL block and the second block each have an $M_w$ of about 0.25 kDa or greater.

11. A block copolymer according to claim 1, wherein the PMVL block has a $^{14}C/^{12}C$ ratio greater than zero.

12. A block copolymer according to claim 1, wherein the block copolymer is an ABA block copolymer, wherein the mid-block is the PMVL block, and wherein the end blocks are formed from a polymer having glass transition temperature 30° C. or more.

13. A method of forming a block copolymer, comprising:
providing a living poly((β-methyl-δ-valerolactone) (PMVL) polymer or a telechelic PMVL block; and
polymerizing one or more monomers from the living PMVL polymer or the telechelic PMVL block,
wherein polymerizing the one or more monomers produces a polymer block having a glass transition temperature 10° C. or more greater than the glass transition temperature of the PMVL block,
wherein the living PMVL polymer or the telechelic PMVL block has a $^{14}C/^{12}C$ ratio greater than zero.

14. A method of forming a block copolymer, comprising:
providing a poly((β-methyl-δ-valerolactone) (PMVL) block;
providing a polymer block having a glass transition temperature 10° C. or more greater than the glass transition temperature of the PMVL block; and
coupling the PMVL block to the polymer block having a glass transition temperature 10° C. or more greater than the glass transition temperature of the PMVL block,
wherein providing the PMVL block comprises providing a PMVL block having a $^{14}/^{12}C$ ratio greater than zero.

15. A block copolymer comprising:
a poly((β-methyl-δ-valerolactone) (PMVL) block, further comprising a second block formed from polylactic acid.

* * * * *

UNITED STATES PATENT AND TRADEMARK OFFICE
CERTIFICATE OF CORRECTION

PATENT NO. : 10,077,340 B2
APPLICATION NO. : 15/304568
DATED : September 18, 2018
INVENTOR(S) : Marc A. Hillmyer et al.

Page 1 of 1

It is certified that error appears in the above-identified patent and that said Letters Patent is hereby corrected as shown below:

In Claim 1, delete "((β" and replace with --(β--.

In Claim 15, delete "((β" and replace with --(β--.

Signed and Sealed this
Third Day of September, 2019

Andrei Iancu
*Director of the United States Patent and Trademark Office*